(12) United States Patent
Schmitz et al.

(10) Patent No.: US 11,927,251 B2
(45) Date of Patent: Mar. 12, 2024

(54) TRANSMISSION ARRANGEMENT, DRIVE UNIT AND METHOD FOR OPERATING A DRIVE UNIT FOR A VEHICLE

(71) Applicant: Pinion GmbH, Denkendorf (DE)

(72) Inventors: Michael Schmitz, Niederelbert (DE);
Christoph Lermen, Karlsruhe (DE);
Linus Geiger, Köngen (DE);
Friedemann Böhmler, Esslingen (DE)

(73) Assignee: Pinion GmbH, Denkendorf (DE)

( * ) Notice: Subject to any disclaimer, the term of this patent is extended or adjusted under 35 U.S.C. 154(b) by 98 days.

(21) Appl. No.: 17/515,245

(22) Filed: Oct. 29, 2021

(65) Prior Publication Data

US 2022/0128126 A1 Apr. 28, 2022

Related U.S. Application Data

(63) Continuation of application No. PCT/EP2020/055188, filed on Feb. 27, 2020.

(30) Foreign Application Priority Data

Apr. 29, 2019 (DE) ...................... 10 2019 111 028.9

(51) Int. Cl.
*F16H 3/00* (2006.01)
*B62M 11/06* (2006.01)
*F16H 3/093* (2006.01)

(52) U.S. Cl.
CPC .............. *F16H 3/006* (2013.01); *B62M 11/06* (2013.01); *F16H 3/093* (2013.01); *F16H 2003/0931* (2013.01)

(58) Field of Classification Search
CPC .......... F16H 3/006; F16H 3/093; B62M 11/06
(Continued)

(56) References Cited

U.S. PATENT DOCUMENTS 4,301,690 A * 11/1981 Cavenagh ............... F16H 63/16
74/363
5,689,998 A * 11/1997 Lee ......................... F16H 3/083
475/152
(Continued)

FOREIGN PATENT DOCUMENTS

CN 102770338 A 11/2012
CN 105682966 A 6/2016
(Continued)

OTHER PUBLICATIONS

International Search Report corresponding to International Application No. PCT/EP2020/055188, dated Jun. 22, 2020, 4 pages.
(Continued)

*Primary Examiner* — Ha Dinh Ho
(74) *Attorney, Agent, or Firm* — Reising Ethington P.C.

(57) ABSTRACT

Gear arrangement for a vehicle, having an input shaft, a layshaft, an output shaft connected to a drive wheel of the vehicle, a plurality of shiftable first gear wheel sets which connect the input shaft and the layshaft and which are each associated with at least one gear stage, and a machine gear connected to one of the shafts and into which the drive torque of an electric machine can be introduced. The first gear wheel sets form a first part-gear mechanism, wherein at least one second shiftable gear wheel set connects the layshaft and the output shaft and forms a second part-gear mechanism, wherein the at least one second gear wheel set is associated with at least one gear stage and wherein the machine gear is arranged in an axial direction between the first part-gear mechanism and the second part-gear mechanism.

15 Claims, 9 Drawing Sheets

(58) Field of Classification Search
USPC .......................................................... 74/331
See application file for complete search history.

(56) References Cited

U.S. PATENT DOCUMENTS

| | | | | |
|---|---|---|---|---|
| 5,924,950 | A * | 7/1999 | Pusic | ..................... B62M 11/04 475/287 |
| 6,978,692 | B2 * | 12/2005 | Thery | ..................... F16D 21/04 74/372 |
| 8,628,447 | B2 * | 1/2014 | Schmitz | ................. F16H 3/083 475/330 |
| 8,708,084 | B2 * | 4/2014 | Kuroki | ..................... B62M 6/70 180/205.1 |
| 9,822,844 | B2 | 11/2017 | Schmitz | |
| 2011/0011193 | A1 * | 1/2011 | Matsumoto | ............. F16H 63/30 74/325 |
| 2011/0168472 | A1 | 7/2011 | Li | |
| 2020/0354006 | A1 | 11/2020 | Schmitz | |

FOREIGN PATENT DOCUMENTS

| | | |
|---|---|---|
| CN | 106660608 A | 5/2017 |
| DE | 102008064514 A1 | 7/2010 |
| DE | 102010051727 A1 | 5/2012 |
| DE | 102011120675 A1 | 6/2013 |
| DE | 102014009833 A1 | 1/2016 |
| DE | 102016225163 A1 | 6/2018 |
| DE | 102018101911 A1 | 8/2019 |
| DE | 102018123575 A1 | 3/2020 |
| EP | 2338781 A1 | 6/2011 |
| WO | 2020221491 A1 | 11/2020 |

OTHER PUBLICATIONS

Written Opinion corresponding to International Application No. PCT/EP2020/055188, dated Jun. 22, 2020, 8 pages.

Office Action issued by the China National Intellectual Property Administration for the application 202080047980.4 dated Jan. 5, 2023.

English translation of the office Action issued by the China National Intellectual Property Administration for the application 202080047980.4 dated Jan. 5, 2023.

* cited by examiner

TRANSMISSION ARRANGEMENT, DRIVE UNIT AND METHOD FOR OPERATING A DRIVE UNIT FOR A VEHICLE

CROSS-REFERENCE TO RELATED APPLICATIONS

This is a Continuation application of International patent application PCT/EP2020/055188, filed Feb. 27, 2020, which claims the priority of German patent application DE10 2019 111 028.9, filed Apr. 29, 2019, the entire content of these earlier applications being incorporated herein by reference.

TECHNICAL FIELD

The present disclosure relates to a gear arrangement for a vehicle, in particular for a vehicle which can be driven using muscular force, such as a bicycle, having an input shaft, having a layshaft, having an output shaft which can be connected to a drive wheel of the vehicle, having a plurality of shiftable first gear wheel sets which connect the input shaft and the layshaft and which are each associated with at least one gear stage, and having a machine gear which is connected or can be connected to one of the shafts and into which the drive torque of an electric machine can be introduced.

Furthermore, the present disclosure relates to a drive unit for a vehicle, in particular for a vehicle which can be driven using muscular force, such as a bicycle, having a gear arrangement of the above-described type and having an electric machine which is connected to the machine gear of the gear arrangement.

The present disclosure further relates to a method for operating a drive unit of the above-described type.

BACKGROUND

A gear arrangement and a drive unit of the above-described type are known from document DE 10 2010 051 727 A1 and document DE 10 2011 120 675 A1.

Vehicles which can be driven using muscular force, such as bicycles, are generally provided with gear shift devices in order to configure a plurality of different transmission ratios between a drive shaft which is connected to cranks and a drive wheel of the vehicle.

Such gear shift devices contain hub gears shifts, as have always been known, for example, as three-way gear shifts. Most gear shifts are produced as so-called derailleurs in which a bicycle chain can be brought into engagement with different chain wheels coaxially relative to a drive shaft and/or with different gears of a sprocket in the region of the driven wheel (rear wheel).

Document DE 10 2008 064 514 A1 discloses a gear unit for such a vehicle, in which a through-shaft which is connected to tread cranks for driving the vehicle and a layshaft are provided. On the layshaft, there are arranged shiftable idler wheels which in each case form a part-gear mechanism with gears of the through-shaft and with gears of an output shaft. The output shaft is arranged coaxially relative to the through-shaft. As a result of such a gear unit, for example, 18 different gear stages can be produced and in contrast to derailleurs each have completely different transmissions and can produce a significant gear ratio spread.

In addition, it is known to provide bicycles with auxiliary motors. In one variant, a hub motor is arranged in the region of the front wheel or the rear wheel hub. Such hub motors are generally provided in combination with derailleurs. In rear wheel hub motors, the combination with a hub gear is complex since the motor requires a large structural space. This leads to a high weight and an unfavourable weight distribution since the proportion of the unsprung masses of the bicycle increases. In hub motors, slowly rotating electric motors which provide a relatively high torque are used. However, these are relatively large and have a high weight.

Another drive concept in bicycles with electric auxiliary motors is to install the auxiliary motors as central motors in the region of the bottom bracket. In this instance, a torque which is provided by the electric drive motor is transmitted directly to a sprocket which is generally arranged coaxially relative to the drive shaft (tread crank). In this instance, it is often problematic that the chain in the bottom bracket region cannot be moved from one sprocket to another. The use of derailleurs is consequently limited.

The above-mentioned document DE 10 2010 051 727 A1 discloses a drive unit which connects a spur gear mechanism which is arranged in the region of the tread crank (as known from DE 10 2008 064 514 A1) to an auxiliary electric motor.

In this instance, there is generally provision for the introduction of torque into the gear arrangement to be carried out at an axial end of the gear arrangement.

Document DE 10 2011 120 675 A1 discloses a torque detection arrangement for a vehicle which is driven by means of muscular force. The torque is detected indirectly via a torsion angle between a drive shaft and an input shaft which are connected to each other in a resilient manner in the rotation direction by means of a rotary resilient element.

SUMMARY

Against this background, an object of the present disclosure is to provide an improved gear arrangement, an improved drive unit and an improves method for operating a drive unit.

The above object is achieved by a gear arrangement of the type mentioned in the introduction, wherein the first gear wheel sets form a first part-gear mechanism, wherein at least one second shiftable gear wheel set connects the layshaft and the output shaft and forms a second part-gear mechanism, wherein the at least one second gear wheel set is associated with at least one gear stage and wherein the machine gear is arranged in an axial direction between the first part-gear mechanism and the second part-gear mechanism.

The above object is further achieved by a drive unit for a vehicle of the above-described type, having a gear arrangement of the type according to the disclosure and having an electric machine which is connected to the machine gear of the gear arrangement.

Finally, the above object is achieved by a method for operating a drive unit of the type according to the disclosure, wherein a shifting operation of at least one of the wheel sets is carried out by means of the shifting apparatus during a time period in which a muscular force torque which acts periodically on a drive shaft is at a minimum, and/or wherein, when a wish to shift is detected, a torque provided by the electric machine is initially increased for a first short time period in order to tension at least the gear arrangement and, subsequently, the torque provided by the electric machine is rapidly reduced in order to move the gear arrangement for a second short time period into a load-free state, wherein the shifting apparatus is temporally controlled in such a manner that a shifting of a gear wheel set falls within this second short time period.

The gear arrangement is constructed as a spur gear arrangement and is configured to establish a plurality of gear stages. Via a machine gear which is connected or can be connected to one of the shafts, the drive torque of an electric machine is introduced into the gear arrangement. Preferably, the second part-gear mechanism has a plurality of second shiftable gear wheel sets. In this instance, the gear arrangement is constructed in the manner of a group gear mechanism. The number of gear stages which can be configured is produced by multiplying the number of first gear wheel sets by the number of second gear wheel sets.

The gear arrangement may be arranged in particular in the bottom bracket region. The input shaft is preferably coaxial with the output shaft. The input shaft and the output shaft are preferably coaxial with a crankshaft.

As a result of the arrangement of the machine gear in an axial direction between the two part-gear mechanisms, it is possible for the torque produced by a driver by means of muscular force to be able to be guided via both part-gear mechanisms, whereas the drive torque provided by the electric machine is guided via the second part-gear mechanism. In an alternative embodiment, however, it is also possible for the machine gear to be connected to the part-gear mechanisms in such a manner that the electric machine can also guide drive torque via the first part-gear mechanism and the second part-gear mechanism.

In the drive unit according to the disclosure, it is preferable for the electric machine to be arranged with the longitudinal axis thereof parallel with the shafts of the gear arrangement. Generally, however, it is also conceivable for the electric machine to be arranged with the longitudinal axis thereof transversely, in particular orthogonally, with respect to the shafts of the gear arrangement. In this instance, the electric machine could be connected to the gear arrangement, in particular to the machine gear, by means of an angular gear. It is in any case preferable for the electric machine to be connected or to be able to be connected to the machine gear by means of a lead or step-down gear mechanism. For example, the lead gear mechanism may have a lead gear shaft which contains two fixed gears. One of the fixed gears is in engagement with a pinion of a rotor shaft. The other fixed gear is in engagement with the machine gear. Alternatively, the lead gear mechanism may have a planetary gear wheel set which is preferably arranged parallel with a rotor shaft of the electric machine. The planetary gear wheel set preferably has three members, of which one is secured to the housing in order in this manner to be able to provide a fixed high lead gear mechanism.

The input shaft and the output shaft are preferably constructed in each case as hollow shafts which are arranged around the drive shaft (crankshaft). The input shaft and the output shaft are preferably arranged in an axially offset manner on the drive shaft, wherein the machine gear is preferably arranged axially therebetween.

The gear wheel sets of the first and the second shifting gear mechanisms are preferably activated by means of a shifting apparatus which has an electric shifting motor. The shifting motor may be arranged with the longitudinal axis thereof parallel with the shafts of the gear arrangement or orthogonally relative thereto. In the latter case, the electric shifting motor could be connected by means of a worm gear to a ring gear of a shifting apparatus. The shifting apparatus preferably further contains a camshaft which is arranged inside the layshaft which is constructed as a hollow shaft. The camshaft rotates with the layshaft during operation. The layshaft and the camshaft are preferably connected to each other by means of a speed modulation gearbox which preferably contains two coupled planetary gear wheel sets. The coupling is realized in such a manner that the sun wheels of these two planetary gear wheel sets generally rotate at the same speed. Only when a rotation movement is introduced into a member of the first planetary gear wheel set (for example, a ring gear of one planetary gear wheel set) is there a relative rotation between the camshaft and the layshaft, whereby a source gear stage can be disengaged and a target gear stage can be engaged.

The shifting apparatus preferably has a single-stage or multiple-stage reduction gear mechanism (planetary, spur, worm or the like) in order to increase the torque or to be able to configure the shifting motor to be smaller.

The combination of a shift gear mechanism with a plurality of gear stages, an electric drive motor and a shifting apparatus with an electric shifting motor is particularly advantageous. This is because, in this instance, it is possible to carry out shifting operations in such a manner that they are adapted to, in particular synchronised with, a torque which is provided by the electric drive machine. This can be seen in particular in the above-described method according to the disclosure for operating a drive unit. The driver can as before introduce a shifting operation and preferably via a shift actuator which is provided on a handlebar. However, the actuation thereof is detected by a control device and, on this basis, in a manner coordinated with the supply of torque by the electric drive motor, an actuator, in particular in the form of the above-mentioned electric shifting motor, is controlled in order to be able to carry out the shifting operation in an efficient manner.

Preferably, a sensor unit is provided in order to detect a torque which is introduced by the driver and the speed produced by the driver, and optionally a position of the crank attitude.

In place of a sensor system for detecting a crank attitude, it is also conceivable to configure the drive shaft in such a manner that the cranks can be fixed thereon only in a determined rotation position relative thereto. In this instance, the crank position can be derived from the rotation position of the drive shaft. Preferably, the cranks and a drive shaft have a shape which is non-uniform over the periphery. When the cranks are connected to the drive shaft by means of a tooth arrangement, the tooth arrangement may, for example, have a non-uniform pitch or a single, specific, differently shaped tooth.

The shifting apparatus further preferably has a position/speed sensor for controlling or regulating shifting operations. Furthermore, the shifting apparatus preferably contains a single-stage or multiple-stage reduction or speed adaptation gear mechanism for speed reduction of the shifting actuator (shifting motor).

A control and electronic power system, by means of which the electric drive machine and the shifting motor can be controlled, are preferably an integral component of the drive unit and are preferably received inside a housing of the drive unit.

The drive unit preferably has connections for other peripheral components, such as, for example, a battery, a human interface, a switch or shifter, a wheel speed sensor for detecting a speed of a driven wheel of the vehicle, and preferably universal interfaces (CAN-bus), etcetera, in order to be able to access the electronic system from the outer side, for example, for diagnosis, maintenance or software update purposes.

As a result of the above-mentioned possibility of carrying out a shifting operation in a coordinated manner by means of a shifting actuator and providing torque by means of the electric drive motor, it is possible to carry out a shifting operation under full load.

In a preferred embodiment, the camshaft described above may also be used to control a controllable free wheel. For this instance, the electric machine can be separated from the drive train for specific circumstances, for example, in order to prevent a clicking noise.

The camshaft can be configured in several portions, for example, a camshaft portion for each part-gear mechanism and a camshaft portion for controlling a pawl which is associated with the electric machine. The camshaft portions may be permanently connected, may be axially displaceable relative to each other or may be connected to each other in a rotationally secure manner only by means of a part-rotation. The camshaft of one or both part-gear mechanisms may also have a geometry which is configured in such a manner that, in one rotation position in one or both part-gear mechanisms, all free wheels are deactivated, that is to say, no gear is engaged. Together with the control and a corresponding anti-theft device (PIN code, key), an anti-theft protection can thereby be brought about in which the drive unit is in idle mode for the driver and/or electric machine.

The gear arrangement of the drive unit preferably runs in a fluid bath, in particular an oil bath. A seal with respect to fluid is preferably used between a gear mechanism space and electric motors or an electronic system.

The fluid can be used as a heat transport medium in order to transport thermal energy from regions with a significant heat input into regions with a high thermal capacity (for example, gears and housings).

In a preferred embodiment, the fluid may also be actively transported to locations with a large thermal input. This may, for example, be carried out by injecting warm regions with fluid by the running gears wheels (in the manner of a splash lubrication). Furthermore, it is also conceivable to pump fluid by means of a fluid pump through cooling channels to structures which are thermally connected to a heat source (for example, electronics or stator winding heads). In this instance, separate cooling members may be provided, heat exchangers or the like.

The fluid system for heat distribution and discharge may also have a separate fluid volume which is not connected to the oil volume for lubrication. A separate storage volume or a completely closed circuit would then be required for this.

The electric machine of the drive unit is preferably a brushless DC motor (BLDC). The electric machine is controlled via an electronic power system. A rotor position sensor (magnet and sensor) is preferably positioned centrally on the rotor shaft of the electric machine. The electric machine preferably drives a multi-stage reduction gear mechanism which can be incorporated in different positions and in different manners in the force path of the drive unit.

The electric machine is preferably mechanically connected to the gear arrangement by means of a clutch or a free wheel, in particular to avoid the electric motor being carried above a speed threshold (for example, 25 km/h) or during travel without support.

During travel over 25 km/h or also in any other situation in which a speed is applied to the layshaft but not to the electric machine, it may be advantageous for the electric machine also to be "operated" with minimal torque so that a frictional connection of a free wheel of the electric machine is maintained. A pulsed load (engaging impact) can be prevented as soon as the electric machine is turned on again.

The objective is thus completely achieved.

As mentioned above, it is particularly preferable for the machine gear to be connected by means of a free wheel to one of the shafts, in particular to the layshaft.

The free wheel may in particular be a shiftable free wheel which can be activated and deactivated. The free wheel is preferably arranged coaxially relative to one shaft.

As a result of deactivation of the shiftable free wheel, the electric machine can be completely decoupled from the gear unit. When the shiftable free wheel is activated, a drive torque which acts in the drive direction of the electric machine can be transmitted to the corresponding shaft of the gear arrangement, for example, to the layshaft. As long as the corresponding shaft rotates more quickly than the machine gear, the machine gear is "overtaken", whereby a free wheel clicking typically occurs.

According to another preferred embodiment, the machine gear is securely connected to the layshaft, wherein the electric machine can be connected to the machine gear by means of a separating clutch or a free wheel, in particular a shiftable free wheel (for example, an electromechanical friction or positive clutch).

Whilst, when the machine gear is connected to one of the shafts via a free wheel, this free wheel is generally arranged coaxially relative to the corresponding shaft, in the other variant, in which the electric machine can be connected to the machine gear by means of a separating clutch or a free wheel, this separating clutch or this free wheel is preferably not arranged coaxially relative to one of the shafts of the gear arrangement. The separating clutch may in particular be provided in an axially parallel manner, in particular on a machine/rotor shaft. Preferably, the separating clutch is arranged in front of a lead gear mechanism.

The separating clutch may, for example, be a claw clutch which can preferably be activated by means of an actuator, such as an electric shifting actuator. The separating clutch may be a normally closed clutch which is activated if necessary in order to open the clutch. Alternatively, however, the separating clutch may also be a normally closed clutch or a bistable clutch.

According to another preferred embodiment, in a gear arrangement for a vehicle, in particular for a vehicle which can be driven using muscular force, such as a bicycle, having an input shaft, having a layshaft, having an output shaft which can be connected to a drive wheel of the vehicle, having a plurality of shiftable first gear wheel sets which connect the input shaft and the layshaft and which are each associated with at least one gear stage, and having a machine gear which is connected or can be connected to one of the shafts and into which the drive torque of an electric machine can be introduced, the machine gear is connected by means of a free wheel to an intermediate shaft, which is securely connected to an idler wheel of a gear wheel set of the first gear wheel sets, which idler wheel is rotatably supported on the layshaft.

The free wheel, via which the machine gear is connected to the intermediate shaft, is in this instance preferably not a shiftable free wheel, and can thus preferably not be activated by means of the camshaft.

A torque of the electric machine can thereby be introduced via one gear wheel set into the first part-gear mechanism, wherein one of the gear wheel sets is preferably shifted in order to transmit muscular force torque to the layshaft.

Since the free wheel via which the machine gear is connected to the intermediate shaft is preferably not shiftable, it is preferable for safety reasons for the input shaft to be connected by means of an additional, preferably non-shiftable free wheel, to a fixed wheel shaft, to which fixed wheels of the first gear wheel set are secured.

It is thereby possible to prevent drive energy of the electric machine from being introduced in some situations into the crankshaft (drive shaft), which can lead to impairments of comfort for the driver. Furthermore, the safety can be improved since the crank cannot be rotated by the electric machine without the intention of the driver.

According to another preferred embodiment, in a gear arrangement for a vehicle, in particular for a vehicle which can be driven using muscular force, such as a bicycle, having an input shaft, having a layshaft, having an output shaft which can be connected to a drive wheel of the vehicle, having a plurality of shiftable first gear wheel sets which connect the input shaft and the layshaft and which are each associated with at least one gear stage, and having a machine gear which is connected or can be connected to one of the shafts and into which the drive torque of an electric machine can be introduced, the machine gear is connected or can be connected to an intermediate shaft which is arranged coaxially with respect to the input shaft.

In a variant, the intermediate shaft is a fixed wheel shaft to which the fixed wheels of the first part-gear mechanism are secured. In this instance, it is preferable for the electric machine to be connected to the machine gear by means of at least one non-shiftable free wheel. The non-shiftable free wheel may, for example, be integrated inside the lead gear mechanism, for example, on a lead gear shaft thereof.

In this variant, it is preferable for the machine gear to be arranged as an idler wheel coaxially relative to the layshaft and for there to be no coupling possibility between the machine gear and the layshaft.

Furthermore, it is generally preferable for the intermediate shaft to be connected to the input shaft by means of another non-shiftable free wheel, as above, for reasons of comfort and/or safety.

In an alternative embodiment, the machine gear is rotatably supported on the intermediate shaft and is connected to the intermediate shaft by means of a non-shiftable free wheel. In this instance, it is further preferable for the intermediate shaft to be at the same time the fixed wheel shaft to which the fixed wheels of the first part-gear mechanism are secured. The fixed wheel shaft is arranged coaxially around the drive shaft and/or input shaft. The fixed wheel shaft is coupled to the input shaft by means of another non-shiftable free wheel. The additional free wheel is again used for comfort and/or safety reasons. In this preferred variant, both one free wheel and the other free wheel are arranged coaxially relative to the input shaft.

In this variant, it is further preferable for the machine gear to be in engagement with a gear which is secured to an auxiliary shaft which is offset in an axially parallel manner relative to the input shaft and the layshaft. The gear of the auxiliary shaft is in this instance part of a lead gear mechanism (see below).

Furthermore, it is generally conceivable for a shiftable separating clutch to be provided in the power transmission path from the electric machine to the machine gear. In this instance, it is possible to provide neither one free wheel, nor the second free wheel, which is provided for reasons of comfort or safety.

According to another preferred embodiment, in a gear arrangement for a vehicle, in particular for a vehicle which can be driven using muscular force, such as a bicycle, having an input shaft, having a layshaft, having an output shaft which can be connected to a drive wheel of the vehicle, having a plurality of shiftable first gear wheel sets which connect the input shaft and the layshaft and which are each associated with at least one gear stage, and having a machine gear which is connected or can be connected to one of the shafts and into which the drive torque of an electric machine can be introduced, the electric machine is connected to the machine gear by means of a lead gear mechanism, wherein the lead gear mechanism is arranged so as to axially overlap with at least one gear wheel set of the first and/or second shiftable gear wheel sets.

In this manner, a comparatively compact electric machine can be used. Furthermore, the gear arrangement can be constructed to be axially short. It is particularly preferable for the lead gear mechanism to be arranged so as to axially overlap with gear wheel sets of the second shiftable gear wheel sets. It is further preferable in this instance for the electric machine to be arranged so as to axially overlap with gear wheel sets of the first shiftable gear wheel sets.

An "axial overlapping" is intended to be understood to mean that one or all of the gears of the lead gear mechanism are located with at least a portion of the circumference thereof in the region of a circumference of one or more gears of the first and/or second gear wheel sets.

Furthermore, it is on the whole advantageous for the electric machine to be connected to the machine gear by means of a lead gear mechanism, wherein the lead gear mechanism preferably has an intermediate wheel which is rotatably supported on an auxiliary shaft which is arranged offset in a parallel manner with respect to the input shaft and the layshaft.

As a result of the lead gear mechanism, it is possible to use an electric machine as a drive source which is operated at high speeds and which can consequently be constructed in a compact manner. Via the lead gear mechanism, the relatively high speed of the electric machine can then be converted into a speed which is suitable for connection to the gear arrangement.

If the lead gear mechanism has an intermediate wheel, which is rotatably supported on a lead gear mechanism shaft which is arranged offset in a parallel manner with respect to the input shaft and the layshaft, a relatively large transmission can be provided for the lead gear mechanism. In this instance, it is preferable for the intermediate wheel to be in engagement, on the one hand, with a gear of the lead gear mechanism and, on the other hand, with a gear which is rotatably supported coaxially with respect to the input shaft.

According to another advantageous embodiment, in a gear arrangement for a vehicle, in particular for a vehicle which can be driven using muscular force, such as a bicycle, having an input shaft, having a layshaft, having an output shaft which can be connected to a drive wheel of the vehicle, having a plurality of shiftable first gear wheel sets which connect the input shaft and the layshaft and which are each associated with at least one gear stage, and having a machine gear which is connected or can be connected to one of the shafts and into which the drive torque of an electric machine can be introduced, the input shaft is coupled to a drive shaft by means of a spring arrangement of a torque detection device.

The input shaft and the drive shaft can preferably be rotated with respect to each other in a limited manner. The input shaft is preferably arranged around the drive shaft as a hollow shaft. The spring arrangement is preferably formed by means of a torsion spring, in particular in the form of a torsion spring bar. The deflection of the spring arrangement, that is to say, for example, the rotation of the torsion spring bar, can be detected in an appropriate manner. This deflection is preferably proportional to a torque which acts on the drive shaft and which is applied by a driver of the vehicle. Depending on this, the electric machine can then be controlled in order to provide electrical drive torque where necessary.

The drive shaft has at the ends thereof axial tooth arrangements for securing cranks. The axial tooth arrangements may preferably be configured in such a manner that introduction in only one or in two rotation positions which are offset through 180° is possible.

Generally, it is preferable for the gear arrangement to be lubricated, in particular using an oil.

According to another preferred embodiment, in a gear arrangement for a vehicle, in particular for a vehicle which can be driven using muscular force, such as a bicycle, having an input shaft, having a layshaft, having an output shaft which can be connected to a drive wheel of the vehicle, having a plurality of shiftable first gear wheel sets which connect the input shaft and the layshaft and which are each associated with at least one gear stage, and having a machine gear which is connected or can be connected to one of the shafts and into which the drive torque of an electric machine can be introduced, the wheel sets of the gear arrangement are arranged in a housing which defines a fluid sump for producing a lubrication for the wheel sets, wherein a heat source is arranged in the housing and wherein the arrangement of the heat source in the housing is selected in such a manner and/or the housing is constructed in such a manner that the heat source is subjected to the flow of fluid which is removed from the fluid sump during operation, in particular is thrown up during a splash lubrication.

It is thereby possible to cool the heat source efficiently using the fluid. In order to cool the fluid, a fluid cooler may be integrated in the housing.

According to another preferred embodiment, the wheel sets of the gear arrangement are arranged in a housing in which a fluid sump is arranged for lubrication and/or cooling, wherein a fluid pump draws from the fluid sump fluid which is used to cool a heat source, such as, for example, an electronic power unit or stator windings, in particular stator winding heads.

The fluid which is drawn by the fluid pump may, for example, be introduced into a cooling channel circuit which is integrated in the housing and via which the heat source is cooled. The heat source is in this instance preferably thermally coupled to the cooling channel. The fluid drawn by the fluid pump can further be used for injection lubrication in order to direct fluid to an intervention region of gears of the wheel sets. Furthermore, the fluid which is drawn off can also be directed for the purposes of an injection lubrication to a heat source or a cooling member which is connected thereto and which is received in the housing.

Generally, it is advantageous for the heat of the heat source to be transmitted to a heat storage member which may, for example, be the gear wheel set. In this instance, the transmission can be carried out indirectly by means of the fluid. The gear wheel set is comparatively large and heavy and consequently has a relatively high thermal capacity.

Generally, it is further advantageous particularly to cool the power transistors of an electronic power unit by means of suitable cooling elements and the throughflow of cooling fluid. The electronic power unit may be an electronic power unit of the electric machine and/or an electronic power unit of a shifting motor.

Preferably, the electric machine has a stator which is cooled by means of a cooling arrangement. The cooling can be carried out by fluid being guided against a housing wall behind which the stator windings are arranged. Furthermore, the housing may have a cooling channel which is laid in the region of the stator windings in order to cool the stator windings in this manner using cooling fluid which is supplied, for example, by means of a fluid pump. It is particularly preferable for the cooling to be carried out in particular in the region of stator winding heads of the stator windings.

In the drive unit according to the disclosure, it is preferable for a control device for controlling a shifting apparatus for the gear wheel sets and/or for controlling the electric machine to be provided and for a sensor arrangement for detecting at least one status variable of the drive unit to be provided.

The control device is preferably integrated on a printed circuit board which is integrated in the housing of the drive unit. The printed circuit board is preferably received in a region of the housing which is sealed with respect to a fluid sump. The electric machine may also be received in such a sealed region of the housing. The printed circuit board is preferably thermally connected to the housing.

It is particularly preferable in this instance for the sensor arrangement to have a rotor position sensor for detecting a rotation position of a rotor of the electric machine and/or a shifting position sensor and/or a speed sensor for detecting a speed of the input shaft and/or a rotation position sensor for detecting a relative rotation position of the input shaft and/or a crank position sensor for detecting a rotation position of cranks which are connected to a drive shaft and/or a torque sensor for detecting a muscular force torque which is introduced into a drive shaft.

The location sensors, the position sensors and the speed sensors may in each case be formed by means of incremental encoders. An absolute rotation position may, where applicable, be detected by means of an index marking of a pitch of such an incremental rotary encoder. The incremental encoder may, for example, be produced by the individual increments being formed by teeth of a gear, wherein a sensor which is fixed to the housing is associated with the teeth. As a result of a reference/index marking (for example, by omitting a tooth or by only half a tooth being constructed), the absolute rotation position can then where applicable also be detected, for example, a rotation position of an input shaft and consequently cranks.

A position sensor may be in a position to detect a rotation angle or a displacement position. A sensor for detecting the absolute rotation position of the drive shaft may, together with information relating to the rotation position of cranks in relation to the drive shaft, be used in order to detect the absolute position of the cranks which the drive shaft drives. The absolute position of the crank may preferably be used to determine when a muscular force torque acting periodically on a drive shaft is at a minimum or maximum. The muscular force torque is generally minimal when the cranks are vertical. The maximum muscular force torque is generally applied thereto when the cranks are horizontal.

According to another preferred embodiment of the drive unit, a printed circuit board is secured to a housing, wherein the control device and/or at least one sensor of the sensor arrangement is arranged on the printed circuit board, wherein the control device preferably has an electronic power unit for the electric machine and and/or electronic power unit for a shifting motor and/or at least one microprocessor for carrying out an operating program according to the method according to the disclosure.

It is particularly preferable for the rotor position sensor for detecting a rotation position of a rotor of the electric machine and the shifting position sensor for detecting a position of a shifting apparatus to be arranged on such a common printed circuit board.

The printed circuit board is preferably arranged at an axial end of the housing, preferably in an orientation transverse to the axes of the shafts of the gear arrangement.

It is further advantageous for the control device to be constructed and configured to carry out a shifting operation of at least one of the wheel sets by means of the shifting apparatus during a time period within which a muscular force torque acting periodically on a drive shaft is at a minimum.

The detection when a muscular force torque which is acting on a drive shaft is at a minimum can be established by detecting an absolute rotation position of cranks and/or a drive shaft/crankshaft of the gear arrangement. Generally, the torque is minimal when the cranks are vertical. In this instance, the shifting operation can be carried out in a protective manner for the gear arrangement, and where applicable even under load.

According to another preferred embodiment, the control device is constructed and configured, when a wish to shift is detected, to initially increase a torque provided by the electric machine for a first short time period in order to tension at least the gear arrangement and subsequently rapidly to decrease the torque provided by the electric machine in order to place the gear arrangement for a second short time period in a load-free state, wherein the shifting apparatus is temporally controlled in such a manner that a shifting of a gear wheel set falls within this second short time period.

The first short time period is so short that the vehicle is not perceptibly accelerated. Preferably, the first short time period is shorter than a half-period of the drive frequency at which the drive shaft is driven by cranks. When the torque is increased, the entire drive train is preferably tensioned. The energy which is stored therein is released when the torque of the electric machine is rapidly or suddenly decreased so that the gear arrangement is moved into the load-free state. The second short time period is preferably shorter than the first short time period.

Such a rapid decrease of the torque is preferably intended to be understood to mean that the torque is decreased within a time period which is shorter than the first and the second short time periods. The increase of the torque is preferably carried out to a torque which is from 70% to 200% of the maximum torque of the electric machine. When the torque is decreased, the electric machine is reduced to a value of from 5% to 25% of the maximum drive torque. When the torque is decreased, the electric machine is not completely shifted off or shifted into a power-free state in order to avoid any disadvantageous effects occurring as a result of self-induction or counter-induction.

According to another preferred embodiment, the control device is constructed and configured for the first short time period to overlap temporally with a time period in which a muscular force torque acting periodically on a drive shaft is at a maximum and/or the control device is preferably constructed and configured for the second short time period to correspond to the time period within which the muscular force torque acting periodically on the drive shaft is at a minimum.

In any case, it is advantageous for the shifting operation to fall within this second short time period which is preferably within a time period within which the muscular force torque is minimised.

As mentioned above, it is preferable for the electric machine to be able to be uncoupled from the gear arrangement by means of a separating clutch or by means of a shiftable free wheel.

Accordingly, it is advantageous for the electric machine to be able to be connected to one of the shafts by means of such a separating clutch or a shiftable free wheel, wherein the separating clutch or the free wheel is activated where required so that (a) a sudden deactivation of a torque provided by the electric machine is possible and/or (b) a deactivation is carried out when a control device does not obtain any authorisation signal and/or (c) no clicking noise can be heard when the electric machine is shifted off.

The measure (a) can where applicable be carried out for safety reasons. The measure (b) can be used to activate the drive unit only when the control device is supplied with a valid authorisation signal which, for example, can be initiated by an authorisation device. Consequently, the anti-theft protection can thereby be increased. The authorisation device may, for example, contain a PIN code and/or a key. Furthermore, as a result of the measure (c), the comfort of the drive unit can be increased.

The methods according to the disclosure use the various components of the drive unit and the common control thereof by means of a central electronic system in order to significantly expand the functionality of the overall system. There are a number of possibilities for particularly carrying out a shifting under load. In this instance, the driver does not have to produce a deliberate pedal force interruption for the gear change. In principle, in this instance, after the driver has initiated a gear change, he/she should wait until the typically sinusoidal drive torque which is provided by the driver has reached a minimum. It is advantageous for the time of this minimum to be anticipated. Using sensor data (speed, torque, etcetera) and a corresponding evaluation or prognosis, this time can be calculated.

The shifting motor preferably already begins the shifting operation a short time before the minimum to be expected. This procedure may be sufficient when a shifting operation is carried out only in the first part-gear mechanism, and the electric machine is connected between the first part-gear mechanism and the second part-gear mechanism. If a shifting operation is also carried out in the second part-gear mechanism, via which the electric machine transmits torque, the following method is preferably carried out. Shortly before the driver has reached the drive torque minimum and the shifting motor is activated, the drive torque is reduced by the electric machine. At the time of shifting at the relevant part-gear mechanism, the support torque of the electric machine is not thereby also applied in addition to the driver torque.

A particular possibility for improving the shifting behaviour under load is produced by the strategy in which the gear arrangement or the drive train is briefly tensioned and then subsequently relaxed in order to achieve a load-free state. In this state, the shifting motor is then activated and the gear is changed (disengaging a source gear stage and engaging a target gear stage).

It may be advantageous in this instance to activate the shifting motor already beforehand in order to first accelerate the shifting motor. The objective in any case is for the shifting motor to be activated as soon as the driver and electric machine torque together reach a minimum.

After the gear change has been carried out, the torque of the electric motor is again increased to the appropriate step-down torque.

When the torque is reduced, the electric motor is preferably not completely shifted off since this can lead to damage to the electronic system as a result of blind currents resulting from induction phenomena.

In order to be able to reduce the torque as abruptly as possible, it may where applicable be advantageous to deactivate the free wheel of the machine gear which, from the electric machine, drives the layshaft (or the input shaft, depending on the variant). This may, for example, be carried out by means of the internal camshaft which deactivates the corresponding pawl of the shiftable free wheel.

The method described above is based on the fact that all the drive components have as a result of their resilient actions, both resilient and damping properties. The components represent with these properties mechanical energy stores. As a result of the "pretensioning" of the drive train when the torque of the electric machine is increased, the stored energy of the drive train (part-gear mechanism, chain or belt, spokes of the rear wheel, tyre of the rear wheel) is raised to a higher level. Since the load (travel resistance) on the rear wheel is slow (damping properties) and since the drive torque produced by the driver also cannot be suddenly changed (damping properties), the energy of the pretensioned drive train which is abruptly released counteracts the tensioned overall system. As a result of the fact that the system inputs and outputs are slow, according to the time dependency of the inertia the above-described short load-free time period of the transmitting system is produced and can be used to change the gear into an at least almost load-free state.

Of course, the features which are mentioned above and those which will be explained below can be used not only in the combination set out in each case, but also in other combinations or alone without departing from the scope of the present disclosure.

BRIEF DESCRIPTION OF THE DRAWINGS

Embodiments of the disclosure are illustrated in the drawing and are explained in greater detail in the following description. In the drawings.

DETAILED DESCRIPTION

Figure 1:
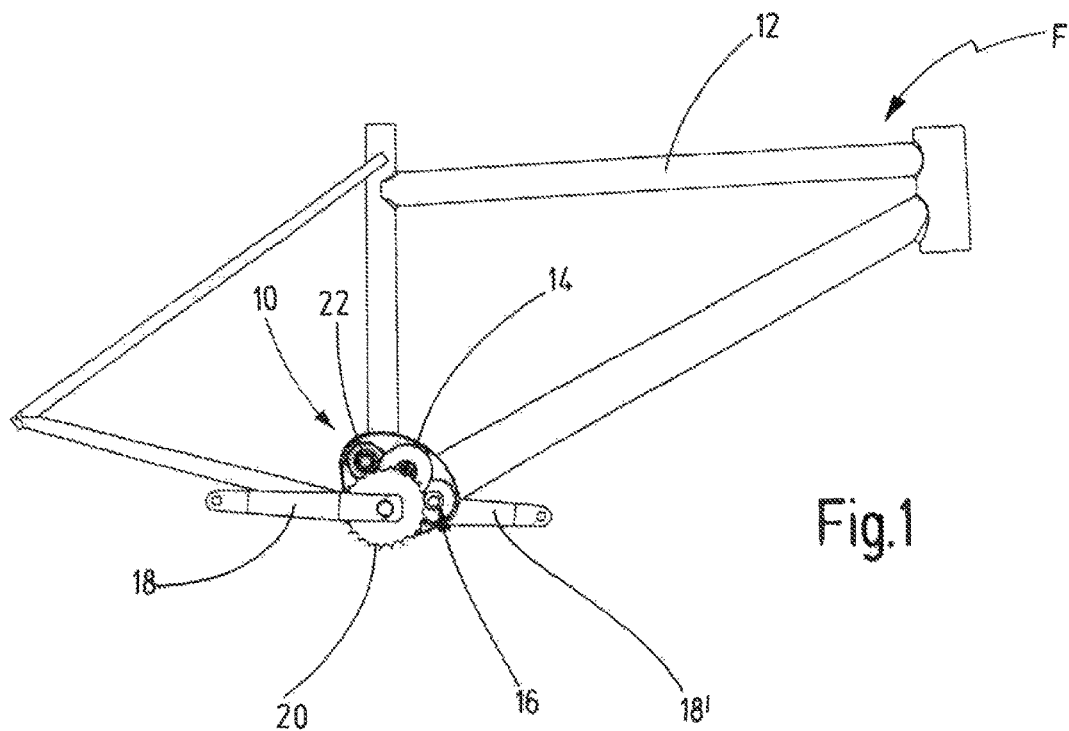
FIG. 1 shows a bicycle frame with an embodiment of a drive unit according to the disclosure.

FIG. 1 is a schematic illustration of a drive unit 10 for a vehicle such as a bicycle F. The drive unit 10 is integrated in a bicycle frame 12 in the region of a bottom bracket. The drive unit 10 may in this instance be integrated in the bicycle frame 12 in such a manner that the drive unit 10 forms the bottom bracket.

The drive unit 10 has a housing 14 which is connected at the outer periphery thereof to a saddle tube and a lower tube (main tube) of the bicycle frame 12.

In the housing 14, there is received a gear arrangement 16 which is constructed to convert a drive movement which is introduced via cranks 18 into the gear arrangement 16 into a rotation of a chain ring or belt wheel 20 with a number of different appropriate transmission or gear ratios.

In the housing 14, there is further received an electric machine 22 which can feed additional drive power into the gear arrangement.

The bicycle F is consequently configured as an E-bike or Pedelec. Preferably, the electric machine 22 can only be controlled to provide drive power when a torque is also introduced via at least one of the cranks 18.

Figure 2:
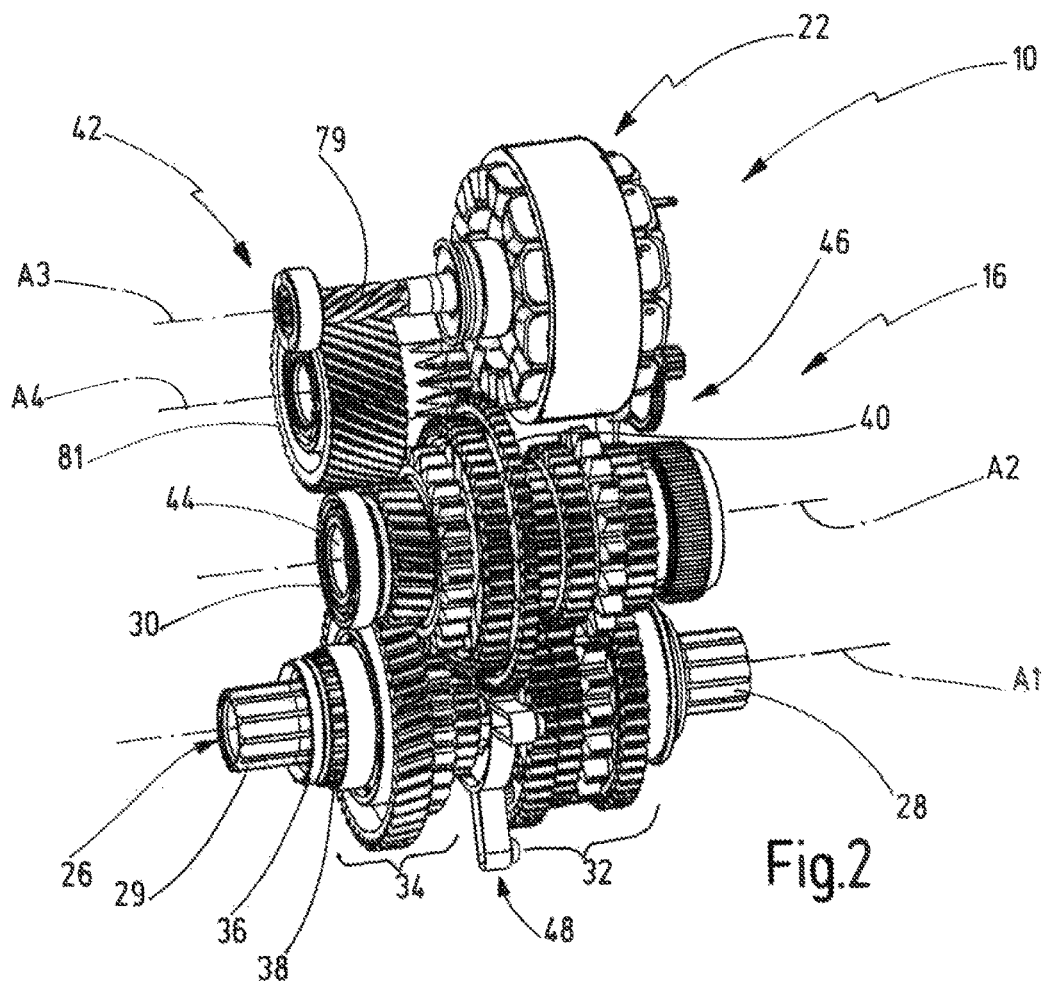
FIG. 2 is a perspective view of another embodiment of a drive unit according to the disclosure without a housing.

FIG. 2 is a perspective illustration of a preferred embodiment of such a drive unit 10.

The drive unit 10 has a drive shaft 26 which is constructed as a crankshaft. At the axial ends thereof, the drive shaft 26 has crank insertion portions 28 onto which the cranks 18 can be axially inserted.

The drive unit 10 further has a layshaft 30 which is arranged offset in an axially parallel manner with respect to the drive shaft 26.

A first part-gear mechanism 32 connects the drive shaft 26 and the layshaft 30. A second part-gear mechanism 34 connects the layshaft 30 to an output shaft 36. The output shaft 36 is arranged coaxially relative to the drive shaft 26 in the form of a hollow shaft around the drive shaft 26. There is provided on the output shaft 36 a plug-type tooth arrangement 38 onto which the chain ring or belt wheel 20 can be axially pushed.

The gear arrangement 16 further contains a machine gear 40, via which drive power of the electric machine 22 can be introduced into the gear arrangement 16. The electric machine 22 is arranged axially parallel with respect to the layshaft 30 and the drive shaft 26. The electric machine 22 is connected to the machine gear 40 via a step-down gear mechanism or a lead gear mechanism 42.

The drive shaft 26 is coaxial relative to an axis A1. The layshaft 30 is coaxial relative to an axis A2. The electric machine 22 is coaxial relative to an axis A3. The step-down gear mechanism or the lead gear mechanism 42 has a lead gear shaft which is not described in greater detail and which is located on an axis A4.

A camshaft 44 is provided concentrically relative to the layshaft 30. The camshaft 44 is arranged radially inside the layshaft 30 and serves to shift shiftable gear wheel sets of the first part-gear mechanism 32 and the second part-gear mechanism 34. The camshaft 44 is coupled to the layshaft 30 by means of a speed modulation gearbox 46 in such a manner that the camshaft 44 generally rotates at the same speed as the layshaft during operation. Via the speed modulation gearbox 46, however, a relative rotation can also be produced in order in this manner to select and shift the individual gear wheel sets.

The gear arrangement 16 further has a torque detection device 48 for detecting a muscular force torque introduced into the drive shaft 26. The torque detection device 48 may be connected to a control device which is not illustrated in greater detail.

The control device which is not illustrated in greater detail is configured to control the electric machine 22 in accordance with a torque which is detected by the torque detection device 48 in order where necessary to provide additional drive torque.

Figure 3:
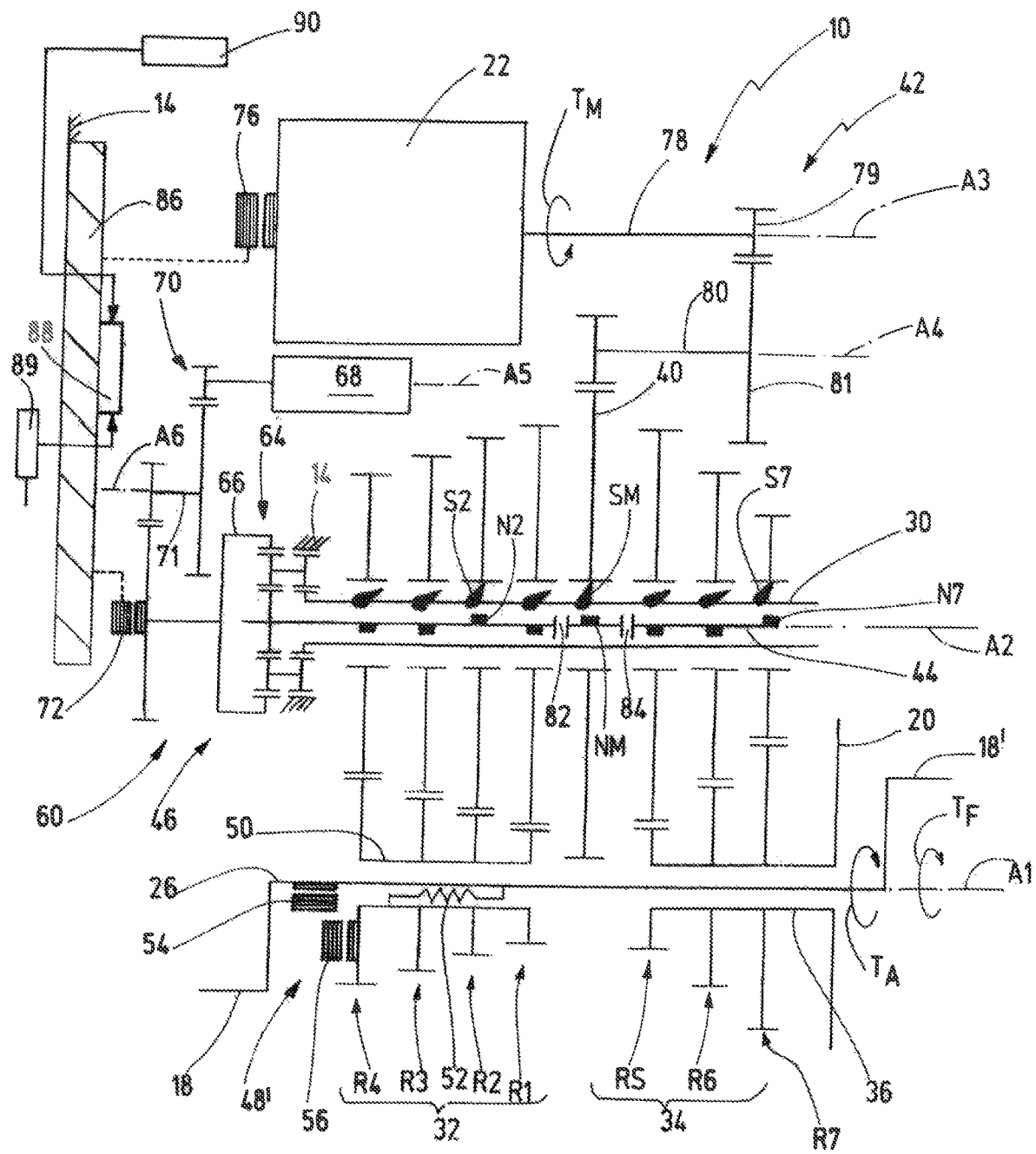
FIG. 3 is a schematic illustration of another embodiment of a drive unit according to the disclosure.

FIG. 3 shows another embodiment of a drive unit according to the disclosure which, with regard to structure and function, generally corresponds to the drive unit 10 of FIG. 2. Elements which are identical are therefore denoted with the same reference numerals. The differences are substantially explained below.

As can be seen in FIG. 3, the drive shaft 26 is coupled by means of a torsion spring 52 of the torque detection device 48' to an input shaft 50. The input shaft 50 is arranged as a hollow shaft around the drive shaft 26 in a state axially offset with respect to the output shaft 36.

A torsion angle sensor 56 of the torque detection device 48' detects a relative rotation of the input shaft 50 with respect to the drive shaft 26. The rotation angle measured in this manner is preferably proportional to a torque which is introduced into the drive shaft 26.

Furthermore, there is provided a rotation position sensor or crank position sensor 54 which detects an absolute rotation position of the input shaft 50.

The first part-gear mechanism 32 has a plurality of four shiftable wheel sets R1, R2, R3, R4 which each contain a fixed wheel which is connected to the input shaft 50 in a rotationally secure manner and an idler wheel which is rotatably supported on the layshaft 30. The second part-gear mechanism 34 has another plurality of wheel sets R5, R6, R7. The wheel sets of the second part-gear mechanism each have a fixed wheel which is connected to the output shaft 36 in a rotationally secure manner and an idler wheel which is rotatably supported on the layshaft 30.

The camshaft 44 has a plurality of cams which correspond to the plurality of wheel sets of the first and second part-gear mechanisms. In FIG. 3, for reasons of clarity, only one shifting cam N2 for the wheel set R2 and the shifting cam N7 for the wheel set R7 are given reference numerals.

The idler wheels of the wheel sets R1 to R7 are in each case connected to the layshaft 30 by means of shiftable free wheels. The shiftable free wheels each have pawls which can be activated by means of the shifting cams (for example, N2, N7). In the relative rotation position shown of the cam shaft 44 with respect to the layshaft 30 of FIG. 3, the shifting cams N2 and N7 activate the pawls S2 and S7 so that, in the conventional forward rotation direction of the drive shaft 26 for driving the bicycle F, the idler wheels of the wheel sets R2 and R7 are coupled to the layshaft 30. The idler wheels of the other wheel sets R1, R3, R4, R5, R6 are in contrast uncoupled from the layshaft 30. In the illustration of FIG. 3, a drive torque which is introduced into the drive shaft 26 can consequently be introduced via the torsion spring 52 into the input shaft 50 and from there via the wheel set R2 into the layshaft 30. From the layshaft 30, the torque can be introduced via the wheel set R7 of the second part-gear mechanism 34 into the output shaft 36.

For relative rotation of the camshaft 44 with respect to the layshaft 30, a shifting apparatus 60 is provided.

The shifting apparatus 60 has a planetary gear wheel set 64 which forms the speed modulation gearbox 46. The planetary gear wheel set arrangement 64 has a first planet wheel set whose sun wheel is connected to the layshaft 30, whose ring gear is coupled to the housing 14 and whose planetary carrier is connected to the planet carrier of a second planet wheel set. The sun wheel of the second planet wheel set is connected to the camshaft 44. The ring gear 66 of the additional planetary gear wheel set serves to introduce relative rotations between the camshaft 44 and the layshaft 30. The ring gear 66 is connected via a speed adaptation gear mechanism 70 to a shifting motor 68 in the form of an electric motor. The shifting motor 68 is arranged coaxially relative to an axis A5. The speed adaptation gear mechanism 70 has a speed adaptation shaft 71 which is located in an axis A6. A pinion which is connected to the shifting motor 68 is connected to a first fixed wheel of the speed adaptation shaft 71. A second fixed wheel of the speed adaptation shaft 71 is connected to a drive wheel which is connected to the ring gear 66 in a rotationally secure manner. A rotation position of the ring gear 66 can be detected by means of a shifting position sensor 72.

In the prior art, as mentioned in the introduction, such a ring gear 66 is generally activated by hand. In this instance, however, the shifting of gear stages in the drive unit 10 is carried out by means of an actuator via the shifting motor 68.

The electric machine 22 has a rotor which is not described in greater detail and whose rotor position can be established by means of a rotor position sensor 76.

The electric machine 22 provides a machine torque $T_M$ which is introduced into a machine shaft 78. The machine torque $T_M$ can be combined with a torque $T_F$ of a driver which is introduced into the drive shaft 26 in such a manner that at the output shaft 36 an output torque $T_A$ which is introduced into the chain ring or the belt wheel 20 is provided.

The gear arrangement 16 has, as mentioned above, a machine gear 40 which is rotatably supported on the layshaft 30. The machine shaft 78 is connected to the machine gear 40 by means of a lead gear mechanism 42. More specifically, the lead gear mechanism 42 has a lead gear shaft 80 which is located on the axis A4 and which is connected to the machine shaft 78 via a first constant wheel set and which has a fixed wheel which is in engagement with the machine gear 40.

The machine gear 40 can be connected to the layshaft 30 by means of a shiftable free wheel. FIG. 3 shows that the shiftable free wheel is activated, wherein a free wheel pawl SM connects the layshaft 30 to the machine gear 40. The free wheel pawl SM can be activated by means of a shifting cam NM of the camshaft 44. The shifting cam NM may be constructed on an individual portion of the camshaft 44 which is connected via a first carrier 82 which is dependent on the rotation position to a portion of the camshaft 44 which is associated with the first part-gear mechanism 32. The portion of the camshaft 44 on which the shifting cam NM is constructed is further connected via the second carrier 84 which is dependent on the rotation position to a portion of the camshaft 44 which is associated with the second part-gear mechanism 34.

The drive unit 10 further has a printed circuit board 86 on which a control device 88 is constructed. The control device 88 receives signals from the various sensors 54, 56, 72, 76 and provides control signals for an electronic power unit of the electric machine 22 and the shifting motor 68. Furthermore, the control device 88 is connected to a shifting unit or a shift 89 which can be arranged, for example, in the region of a handlebar of the bicycle F and via which shifting signals in the form of a wish to shift or the like can be initiated.

If such a wish to shift is obtained via the shifting unit 89, the control device 88 controls the shifting motor 68 in order to carry out the desired shifting operation in which the camshaft 44 is rotated relative to the layshaft 30. This is preferably carried out in a coordinated manner, as will be described below.

The control device 88 is further connected to an authorisation unit 90. The authorisation unit 90 may, for example, contain an input unit for an authorisation code, wherein, as a result of this code, an authorisation signal is then produced and is transmitted to the control device 88. Only when a correct authorisation signal has been obtained is the control device 88 (and/or the gear arrangement) activated.

The authorisation unit 90 may be integrated with the shifting unit 89 in a subassembly which can be mounted in the region of a handlebar of the bicycle.

With the drive unit 10, the following operating modes can be produced. On the one hand, a mode which is operated simply with muscular force is conceivable. To this end, the shiftable free wheel of the machine gear 40 is preferably deactivated by the camshaft 44 being rotated in such a manner that the shifting cam NM moves the free wheel pawl SM into a deactivation position so that the drive power of the electric machine 22 can no longer be introduced into the layshaft 30.

For a Pedelec operating mode, in contrast, the free wheel pawl SM is activated. Via the torque detection device 48, a torque $T_F$ which is introduced into the drive shaft 26 by means of muscular force is detected. The control device then controls the electric machine 22 in such a manner that it additionally provides an electric drive torque $T_M$, preferably depending on various support modes (Eco, Normal or Turbo, to mention a few examples). In this instance, the torque $T_M$ is adjusted in such a manner that there is provided in the region of the output shaft 36 an overall output torque $T_A$ which is composed of the driver torque $T_F$ and an electric drive torque $T_M$ which typically represents a value of from 0.5 times to 4 times the driver torque $T_F$.

In many countries, the electromotive support is limited to a specific speed threshold, for example, 25 km/h. If the driver produces a higher vehicle speed by means of muscular force, the layshaft 30 overtakes the machine gear 40. If the shifting clicking of the shiftable free wheel is perceived to be disruptive in this case, the control device 88 can deactivate the free wheel.

The control device 88 can also activate the shiftable free wheel with the pawl SM, for example, only when a valid authorisation signal has been detected.

If in an error state an impermissible torque is provided by the electric machine 22, the control device 88 can also deactivate the shiftable free wheel with the pawl SM.

If a wish to shift has been detected by the shifting unit 89, the control device 88 initiates a shifting operation of at least one of the wheel sets by means of the shifting apparatus 60 in such a manner that this shifting operation is carried out during a time period in which a muscular force torque $T_F$ acting periodically on a drive shaft is minimal. Alternatively or additionally, when such a shifting wish is detected, a torque which has been provided by the electric machine is initially increased for a first short time period in order to tension at least the gear arrangement and subsequently the torque provided by the electric machine is rapidly reduced in order to move the gear arrangement for a second short time period into a load-free state. The shifting apparatus is in this instance temporally controlled in such a manner that a shifting of the gear wheel set falls within this second short time period.

FIGS. 4 to 7 illustrate additional embodiments of drive units which with regard to structure and operating method generally correspond to the drive unit 10 of FIG. 3. Elements which are the same are therefore given the same reference numerals. The differences are substantially explained below.

Figure 4:
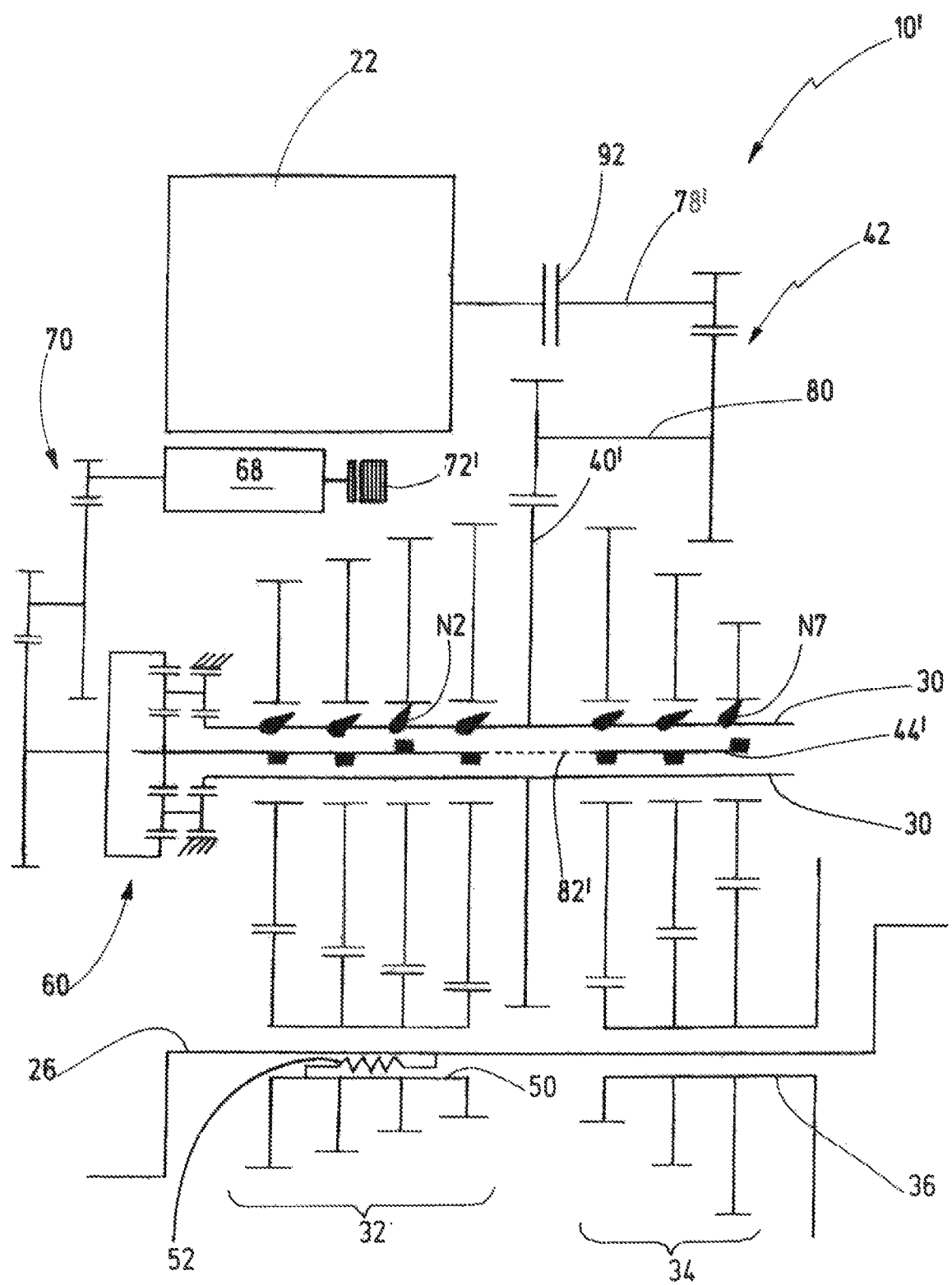
FIG. 4 is a schematic illustration of another embodiment of a drive unit according to the disclosure.

In the drive unit 10' of FIG. 4, the rotor of the electric machine 22 is connected to the machine shaft 78' by means of a separating clutch or free wheel which can be shifted by means of the control device 88. The machine gear 40' is in this instance connected to the layshaft 30 in a rotationally secure manner. The camshaft 44' may be constructed as a continuous shaft or, between a portion which is associated with the first part-gear mechanism 32 and a portion which is associated with the second part-gear mechanism 34, a carrier 82' which is dependent on the rotation position may be provided.

The separating clutch 92 may be a clutch which is normally open and which is closed by means of an actuator which is not illustrated in greater detail when the electric machine 22 is intended to provide drive torque. Alternatively, the separating clutch 92 may also be a clutch which is normally closed and which is opened by means of an actuator if necessary. Such an actuator is typically connected to the control device 88. The actuator may, for example, be an electromagnet actuator or another actuator.

FIG. 4 further shows that the shifting position sensor 72' is connected to a rotor of the shifting motor 68. This embodiment of a shifting position sensor 72 can be produced in a structurally simple manner. However, the shifting position is potentially influenced by play in the speed adaptation gear mechanism 70 so that a detection of the shifting position of the ring gear 66 by means of a shifting position sensor 72, as shown in FIG. 3, is preferred.

Figure 5:
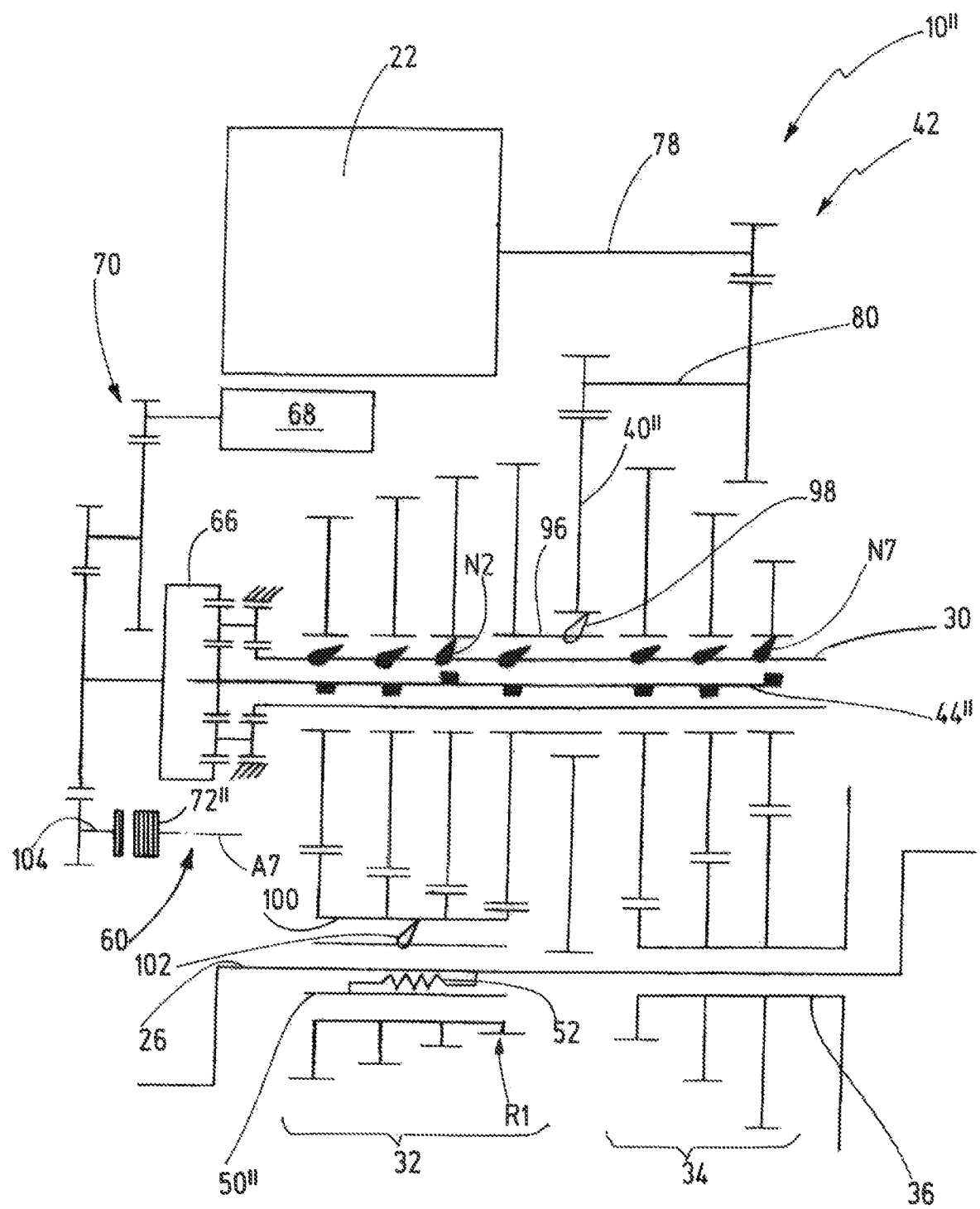
FIG. 5 is a schematic illustration of another embodiment of a drive unit according to the disclosure.

FIG. 5 illustrates another embodiment of a drive unit 10" which is based on the embodiment of FIG. 3.

In place of the shiftable free wheel with the pawl SM, the machine gear 40" is connected by means of a non-shiftable free wheel 98 to an intermediate shaft 96 which is arranged coaxially around the layshaft 30. The intermediate shaft 96 is connected in a rotationally secure manner to the idler wheel of one of the wheel sets of the first part-gear mechanism (or the second part-gear mechanism). The non-shiftable free wheel may also be fitted at the end face to the machine gear 40". In this instance, the free wheel may act directly between the machine gear 40" and the idler wheel of one of the wheel sets of the first part-gear mechanism (or the second part-gear mechanism). The intermediate shaft 96 may be dispensed with in this instance. In this instance, the intermediate shaft 96 is connected to the idler wheel of the wheel set R1.

Furthermore, the fixed wheels R1 to R4 of the first part-gear mechanism 32 are secured to a fixed wheel shaft 100 which is arranged coaxially around the input shaft 50". The fixed wheel shaft 100 is coupled to the input shaft 50" by means of another non-shiftable free wheel 102. It can thereby be ensured that no inadmissible torques are transmitted from the electric machine 22 to the drive shaft 26 which, as in the previous embodiments, is coupled by means of a torsion spring 52 to the input shaft 50".

FIG. 5 further shows a variant of a shifting position sensor 72" which is arranged on a sensor shaft 104 which is located on an axis A7. The sensor shaft 104 is connected to a fixed wheel which is in engagement with the gear onto which a drive torque of the shifting motor 68 is also introduced and which is connected in a rotationally secure manner to the ring gear 66 of the speed modulation gearbox 46. Generally, however, a shifting position sensor, also in the embodiment of FIG. 5, may be configured in any one of the other manners as described above, that is to say, for example, also without a sensor shaft or in an integral manner.

The sensor shaft 104 may in this instance be produced together with a fixed wheel which is secured thereto from plastics material since it does not have to transmit any torque.

Figure 6:
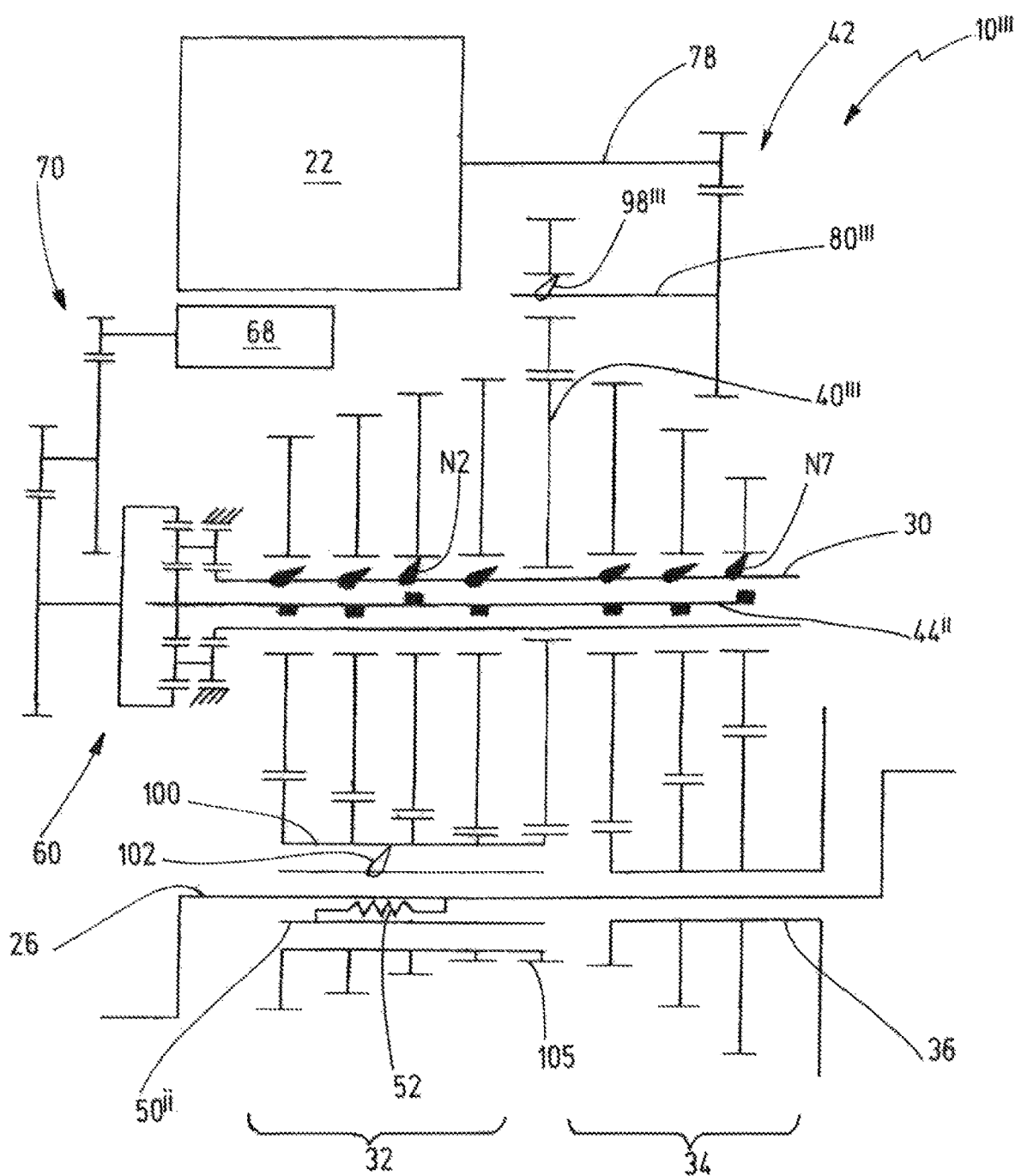
FIG. 6 is a schematic illustration of another embodiment of a drive unit according to the disclosure.

FIG. 6 illustrates another embodiment of a drive train which is based on the embodiment of FIG. 5. In the drive unit 10''', there is rotatably supported on the lead gear shaft 80''' an idler wheel which is in engagement with the machine gear 40'''. The idler wheel of the lead gear shaft 80''' is coupled to the lead gear shaft 80 by means of a non-shiftable free wheel 98''. The machine gear 40''' is rotatably supported on the layshaft 30 and is in engagement with a fixed wheel 105 which is placed on the fixed wheel shaft 100. Consequently, drive power of the electric machine 22 can be introduced into the fixed wheel shaft 100 and from there via the first part-gear mechanism 32 and the second part-gear mechanism 34 onto the output shaft 36.

As in the embodiment of FIG. 5, the fixed wheel shaft 100 is coupled to the input shaft 50'' by means of a second, non-shiftable free wheel 102.

Figure 7:
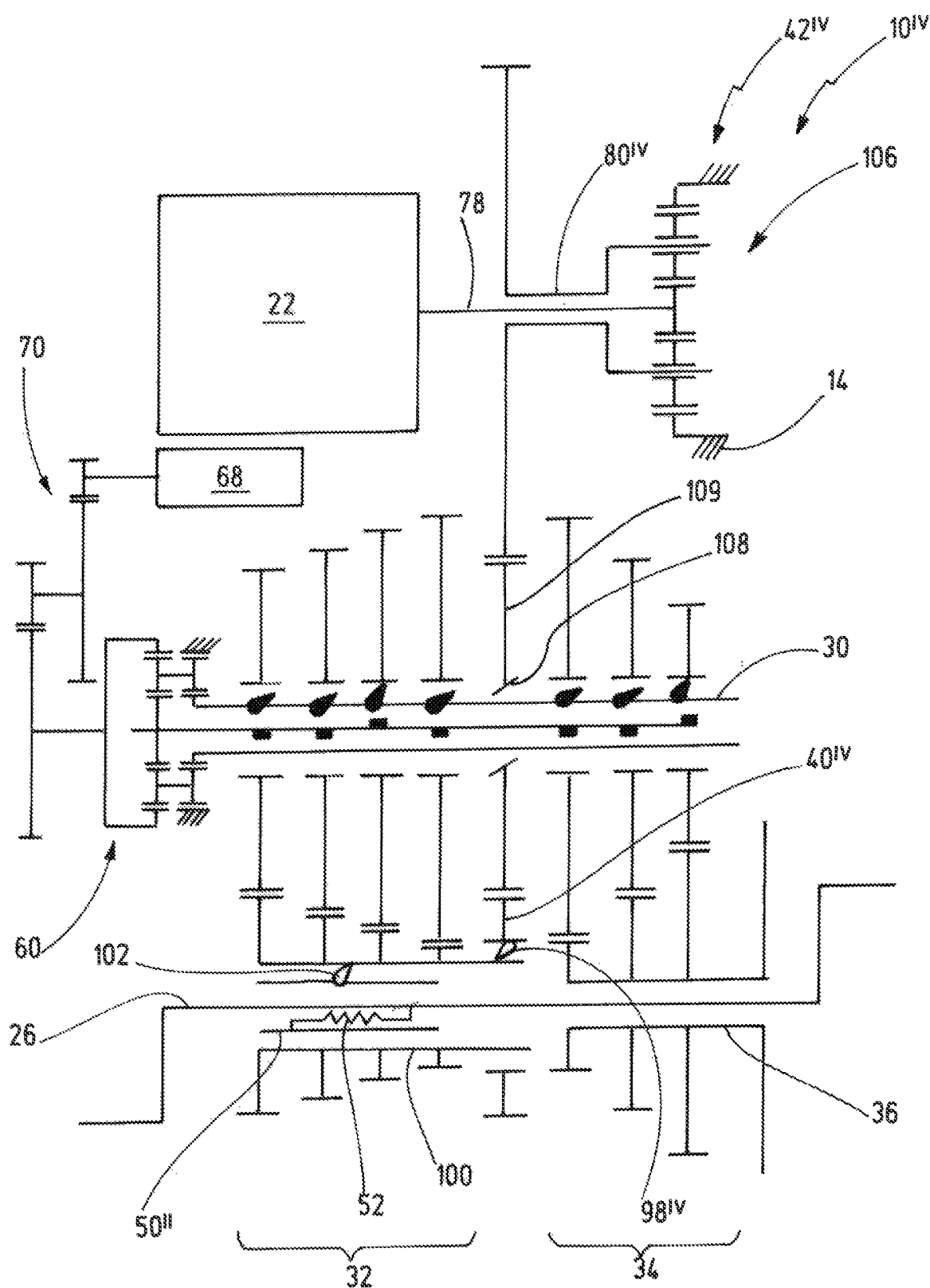
FIG. 7 is a schematic illustration of another embodiment of a drive unit according to the disclosure.

FIG. 7 shows another embodiment of a drive unit $10^{IV}$ which is based on the embodiment of FIGS. 3 and 6. In the drive unit $10^{IV}$, the lead gear mechanism $42^{IV}$ contains a planetary gear wheel set 106 which has three members, of which one (in this instance, the ring gear) is connected to the housing 14. Another member is connected to the machine shaft 78 (in this instance, the sun wheel). A third member (in this instance, the planetary carrier) is connected to a lead gear mechanism shaft $80^{IV}$ which is arranged in this instance as a hollow shaft $80^{IV}$ around the machine shaft 78. The lead gear mechanism shaft $80^{IV}$ is connected to a fixed wheel which is in engagement with an intermediate wheel 109 which is secured to an auxiliary shaft 108. In FIG. 7, the auxiliary shaft 108 is illustrated as being coaxial relative to the layshaft 30. In a preferred embodiment, however, the auxiliary shaft 108 is arranged axially parallel with the layshaft 30. The intermediate wheel 109 is in engagement with a machine gear $40^{IV}$ which is rotatably supported on an intermediate shaft/fixed wheel shaft 100 which is arranged coaxially relative to the drive shaft 26. The fixed wheel shaft 100 is coupled to the machine gear $40^{IV}$ by means of a non-shiftable free wheel $98^{IV}$. Furthermore, the fixed wheel shaft 100 is coupled to the input shaft 50'' by means of a second, non-shiftable free wheel 102, as in the embodiments of FIGS. 5 and 6.

In terms of function, the embodiment of FIG. 7 consequently corresponds to that of FIG. 6.

Figure 8:
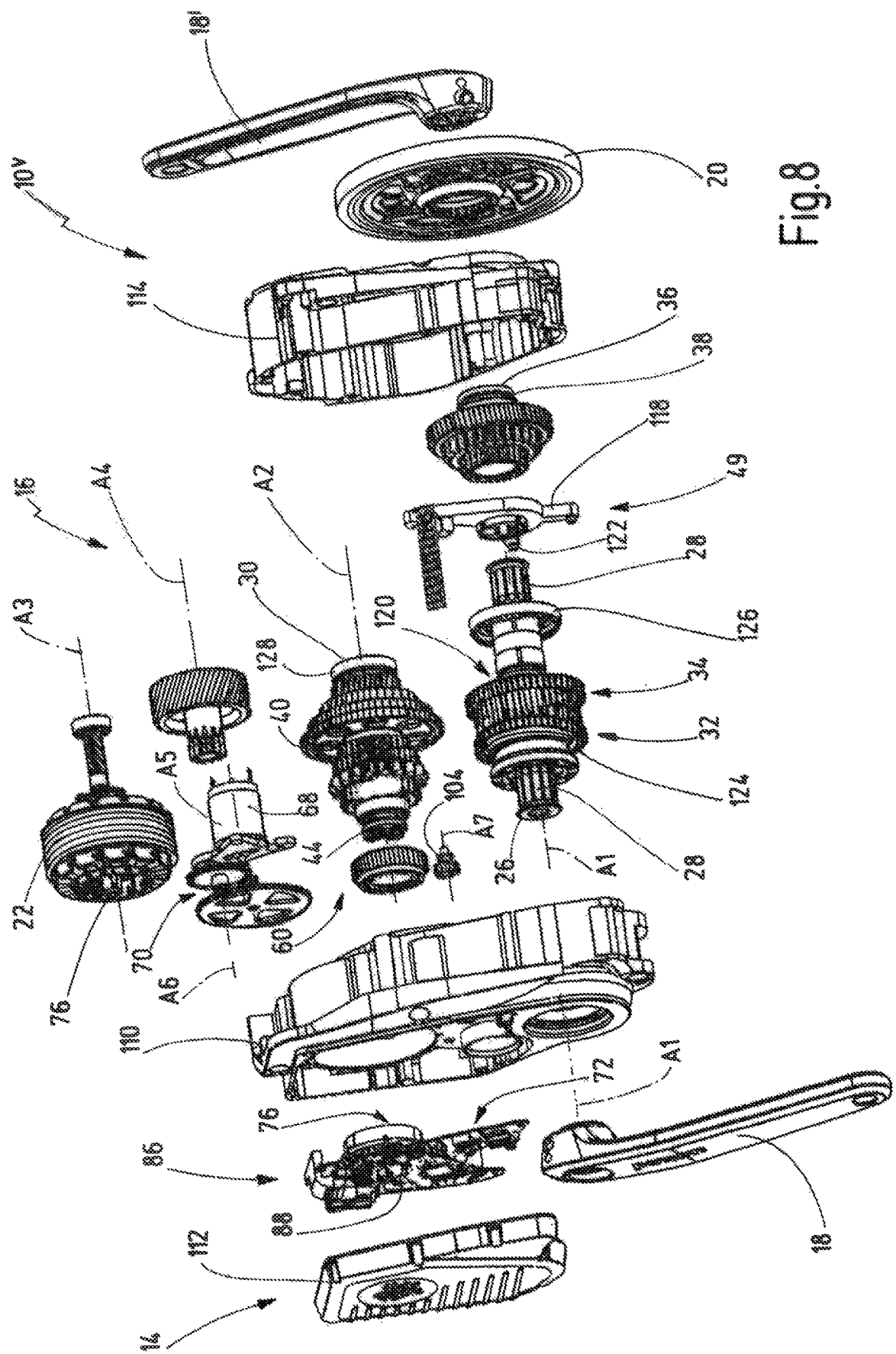
FIG. 8 is an exploded view of the drive unit illustrated in FIG. 2 with a housing.

FIG. 8 is an exploded view of a drive unit $10^V$ which corresponds in terms of structure to the drive unit 10 of FIGS. 2 and 3. It can be seen that the housing 14 has a basic housing 110 and a first housing cover 112 and a second housing cover 114.

A region between the basic housing 110 and the first housing cover 112 is constructed for receiving the printed circuit board 86 with the rotor position sensor 76 which is secured thereto and the shift position sensor 72 which is secured thereto. The space between the basic housing 110 and the first housing cover 112 is preferably fluid-free. In the basic housing 110, suitable seals are provided for this purpose.

The first housing cover 112 and the second housing cover 114 are placed on the basic housing 110 in an axial direction.

In a space which is formed by the basic housing 110 and the second housing cover 114, the gear arrangement 16 is received together with the electric machine 22. The electric machine 22 is, however, preferably received therein in such a manner that at least the stator or the connections thereof (preferably also the rotor) is/are sealed with respect to a fluid space which is formed by the basic housing 110 and the second housing cover 114. The stator of the electric machine 22 is contacted with the printed circuit board 86 by means of plug-type contacts. The rotor of the electric machine 22 preferably has permanent magnets which require no electrical contacting. On the rotor of the electric machine 22, however, there is preferably provided a portion of the rotor position sensor 76 which cooperates with the other portion on the printed circuit board 86.

FIG. 8 further shows a torque detection device 48 which contains a permanent magnet 120 which is secured, for example, to the input shaft 50 or to the drive shaft 26. Furthermore, the torque detection device 48 has at least one Hall sensor 122 which is secured to a sensor unit 118 which is arranged coaxially relative to the drive shaft 26 and which is connected via indicated cables to a control device 88.

FIG. 8 further shows that the shifting position sensor 72 may be constructed in a similar manner to that shown in FIG. 5, having a sensor shaft 104 which is arranged on an axis A7.

Figure 9:
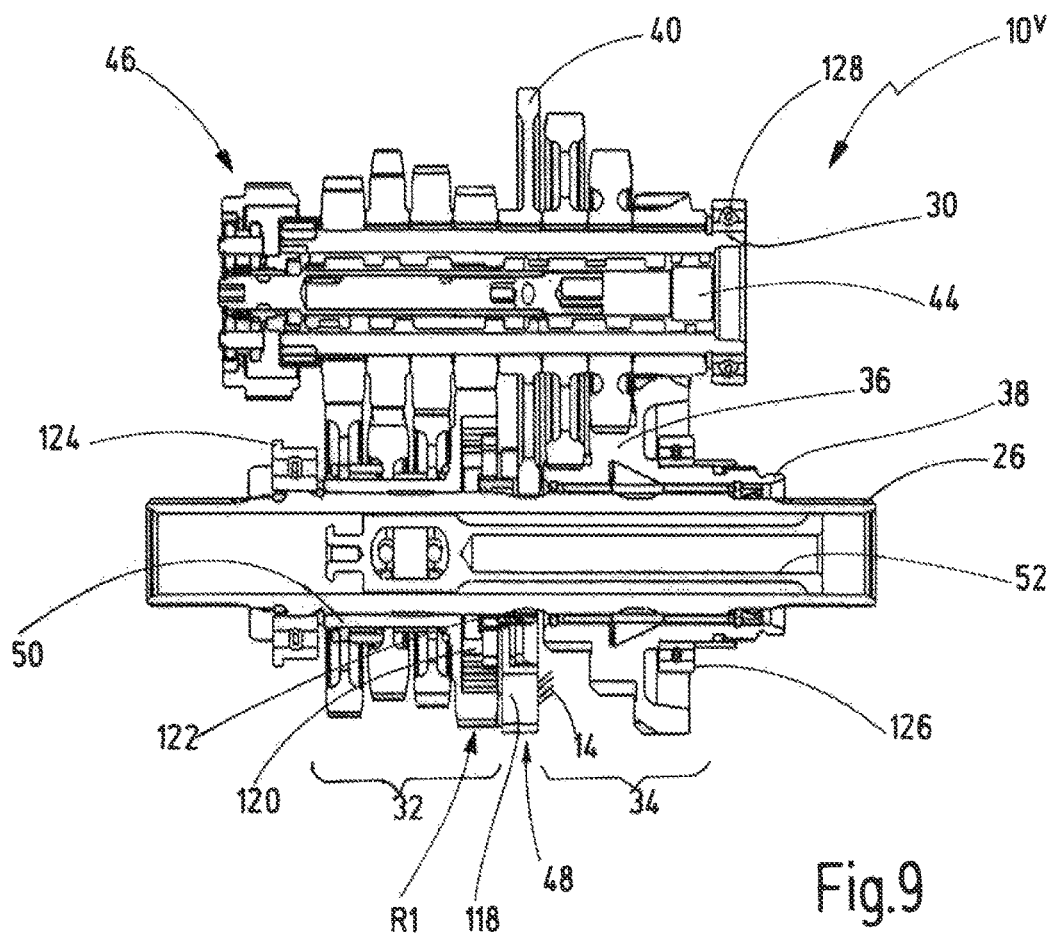
FIG. 9 is a schematic longitudinal sectioned view through a portion of the drive unit of FIGS. 2 and 8.

FIG. 9 is a longitudinal sectioned view of the drive unit $10^V$. It can be seen here that the shaft arrangement is rotatably supported with the drive shaft 26 and the input shaft 50 by means of a first bearing 124 and a second bearing 126, wherein the first bearing 124 is arranged in the region of the basic housing 110 and wherein the second bearing 126 is arranged in the region of the second housing cover 114.

The layshaft 30 is rotatably supported at least by means of a third bearing 128 which is constructed on the second housing cover 114 and preferably by means of a needle bearing which is not illustrated in greater detail at the axially opposite side.

Figure 10:
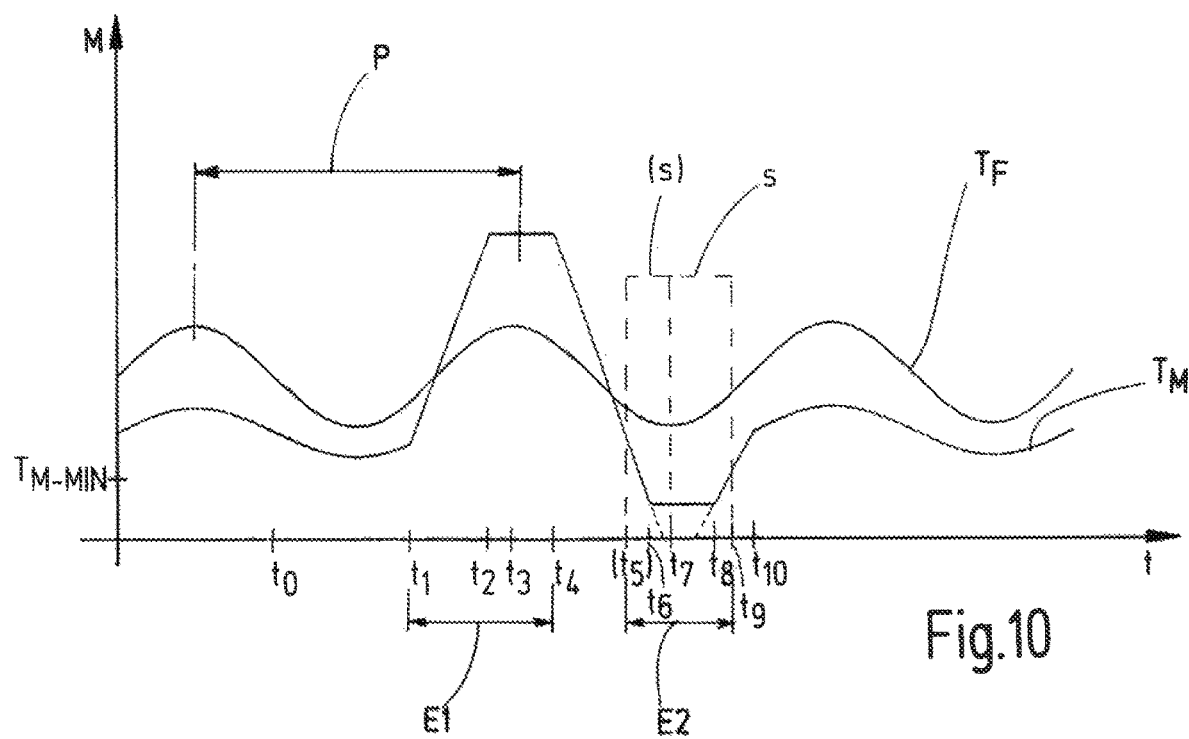
FIG. 10 is a time flow chart of torques over time in a method according to the disclosure for operating the drive unit.

FIG. 10 is a time flowchart of a torque over time.

FIG. 10 shows a shifting operation, which can be carried out under load.

FIG. 10 first shows that a torque $T_F$ which is provided by a driver is applied in an approximately sinusoidal manner to the drive shaft 26, with a period P.

It can further be seen that prior to a shifting operation there is provided by the electric machine a torque $T_M$ which extends in an approximately synchronous manner with the driver torque $T_F$ and which, for example, is approximately from 70% to 80% of the driver torque $T_F$. In other embodiments, however, the torque $T_M$ may also be significantly greater.

At a time $t_1$, a wish to shift is detected by the control device, for example, via the shifting unit 89.

In this instance, the torque $T_M$ of the electric machine is then initially increased, preferably in a synchronous manner with a maximum of the driver torque $T_F$.

The increase of the torque is carried out for a first time period E1, for example, from a time $t_1$ to a time $t_4$. At a time $t_3$, a maximum of the driver torque $T_F$ is reached.

A shifting operation should be carried out at a time $t_7$. At the time $t_4$, the torque $T_M$ of the electric machine is then decreased in such a manner that it reaches a minimum value $T_{M-MIN}$ at a time $t_6$, that is to say, is not reduced to 0. This time $t_6$ is temporally slightly before the minimum of the driver torque $T_F$. The reduction of the torque from the time $t_4$ is consequently temporally placed in such a manner that the time $t_6$ is shortly before the planned shifting time $t_7$.

After the shifting operation, from a time $t_S$, the electric drive torque $T_M$ can be increased again and raised to a normal support level which was also present before the shifting operation. This is achieved at the time $t_{10}$.

For the second short time period $E_2$, the torque is consequently decreased.

As a result of the fact that the torque was initially increased for the time period $E_1$ so that the drive train as a whole was tensioned, and subsequently the torque was rapidly or abruptly decreased, the drive train is on the whole non-tensioned so that a load-free state occurs. This is, for example, provided in a time period of approximately $t_5$ to $t_9$. Preferably, a shifting operation is carried out within a timeframe of $t_6$ to $t_8$, in particular at a time $t_7$.

The shifting operation can consequently be carried out at a time at which the drive train is in a substantially load-free state. Consequently, a shifting can be carried out under load.

The increase of the torque $T_M$ does not act on the speed of the vehicle, as a result of the inertias. Accordingly, the reduction of the torque $T_M$ does not act on the drive behaviour of the vehicle, also as a result of the inertias.

The driver in a manner of speaking does not notice that this brief increase of torque and subsequently a torque reduction have taken place.

Figure 11:
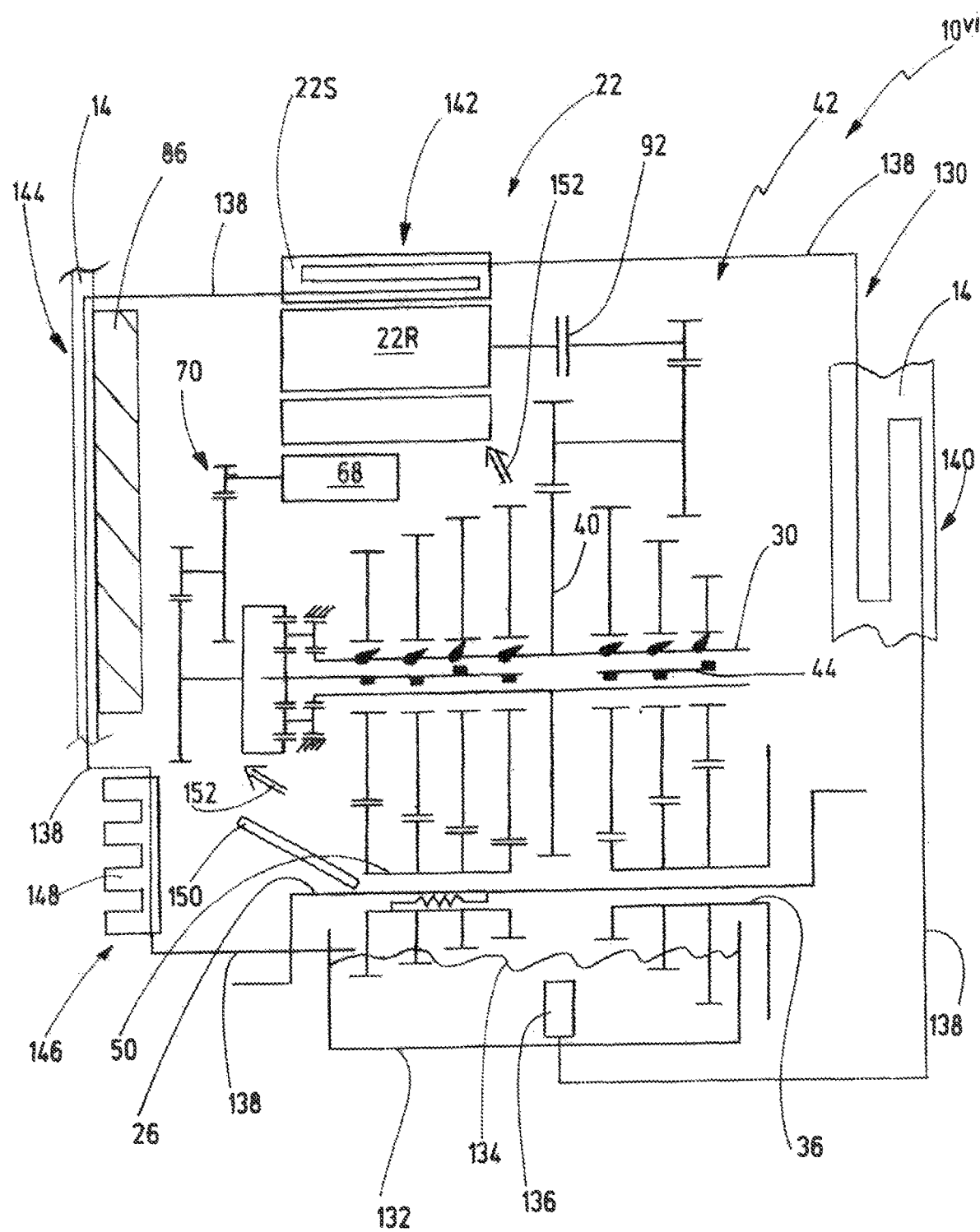
FIG. 11 is a schematic illustration of another embodiment of a drive unit according to the disclosure.

FIG. 11 shows another embodiment of a drive unit $10^{VI}$ which with regard to the function is based on the drive unit $10'$ of FIG. 4. Elements which are the same are consequently given the same reference numerals. The differences are substantially explained below.

FIG. 11 shows that, in order to cool the electronic power unit on the printed circuit board 86 and/or the stator 22S of the electric machine 22, a cooling arrangement 130 may be provided.

The cooling arrangement 130 initially makes use of the fact that there is located in the housing 14 a fluid sump 132 which by way of a splash lubrication lubricates the wheel sets of the first and the second part-gear mechanism. The fluid sump 132 has a fluid level 134. Below the fluid level 134, there is arranged a fluid pump 136 which is operated in an electromotive manner, for example, controlled via the control device 88, or driven by coupling to a shaft which is provided.

The fluid pump 136 pumps fluid into a fluid line 138, which leads to a plurality of cooling locations and which is finally returned to the fluid sump 132.

At a first cooling location 140 of the housing, the fluid can be cooled, for example, from the exterior by a flow of air (not illustrated in greater detail) against the housing 14.

At a second cooling location 142, heat of the stator 22S of the electric machine 22 is discharged into the fluid flowing in the fluid line 138.

To this end, the stator is provided with cooling channels between windings or winding heads. Alternatively, the housing region may also be provided with cooling channels around the stator.

At a third cooling location 144, heat is discharged from the printed circuit board 86 to the fluid flowing in the fluid line 138.

At a fourth cooling location 146, the fluid line 138 may lead through a cooling member 148, via which heat contained in the fluid is discharged again before it is supplied to the fluid sump again.

FIG. 11 further schematically illustrates that there may be provided in the housing 14 a fluid redirection sheet 150 via which the fluid 152 which has been thrown up by the wheel sets can be directed to heat sources, for example, onto the printed circuit board 86 or a cooling member which is connected thereto, and/or, for example, onto stator winding heads of the stator 22S or cooling members which are connected thereto.

LIST OF REFERENCE NUMERALS

10 Drive unit
12 Bicycle frame
14 Housing
16 Gear arrangement
18 Cranks
20 Chain ring/belt wheel
22 Electric machine
26 Drive shaft/Crankshaft
28 Plug-type crank portions
30 Layshaft
32 $1^{st}$ part-gear mechanism
34 $2^{nd}$ part-gear mechanism
36 Output shaft
38 Plug-type tooth arrangement for 20
40 Machine gear
42 Step-down gear mechanism/lead gear mechanism
44 Camshaft
46 Speed modulation gearbox
48 Torque detection device
50 Input shaft (16)
52 Torsion spring (48)
54 Rotation angle sensor (48)
56 Rotation position sensor/crank position sensor
60 Shifting apparatus
64 Planetary gear wheel set arrangement
66 Ring gear
68 Shifting motor
70 Speed adaptation gear mechanism
71 Speed adaptation shaft
72 Shifting position sensor
76 Rotor position sensor
78 Machine shaft
79 Machine pinion
80 Lead gear mechanism shaft
81 Gear
82 $1^{st}$ rotation-position-dependent carrier
84 $2^{nd}$ rotation-position-dependent carrier
86 Printed circuit board
88 Control device
89 Shifting unit
90 Authorisation unit
91 Authorisation signal
92 Separating clutch
96 Intermediate shaft
98 $1^{st}$ non-shiftable free wheel
100 Intermediate shaft/fixed wheel shaft
102 $2^{nd}$ non-shiftable free wheel
104 Sensor shaft
105 Fixed wheel
106 Planetary gear wheel set (42)
108 Auxiliary shaft
109 Intermediate wheel (108)
110 Basic housing
112 $1^{st}$ housing cover
114 $2^{nd}$ housing cover
118 Sensor unit (48)
120 Permanent magnet
122 Hall sensor
124 $1^{st}$ bearing
126 $2^{nd}$ bearing
128 $3^{rd}$ bearing
130 Cooling arrangement
132 Fluid sump
134 Fluid level
136 Fluid pump
138 Fluid line
140 $1^{st}$ cooling location
142 $2^{nd}$ cooling location
144 $3^{rd}$ cooling location
146 $4^{th}$ cooling location
148 Cooling member 150 Fluid redirection sheet
152 Fluid
F Bicycle (E-bike)
A1-A6 Axes
R1-R4 First shiftable wheel sets (32)
R5-R7 Second shiftable wheel sets (34)
S1-S7 Pawls (R1-R7)
N1-N7 Shifting cams (R1-R7)
SM Free wheel pawl (40)
NM Shifting cam (40)
TF Torque of driver
TM Torque of electric machine
TM-MIN Minimum torque of the electric machine
TA Output torque
TF Drive torque at 20
P Period TF
E1 First time period
E2 Second time period

The invention claimed is:

1. Gear arrangement for a vehicle, having:
an input shaft,
a layshaft,
an output shaft which can be connected to a drive wheel of the vehicle,
a plurality of shiftable first gear wheel sets which connect the input shaft and the layshaft and which are each associated with at least one gear stage,
a machine gear which is connected or can be connected to one of the shafts and into which the drive torque of an electric machine can be introduced, wherein:
the first gear wheel sets form a first part-gear mechanism, wherein at least one second shiftable gear wheel set connects the layshaft and the output shaft and forms a second part-gear mechanism, wherein the at least one second gear wheel set is associated with at least one gear stage and wherein the machine gear is arranged in an axial direction between the first part-gear mechanism and the second part-gear mechanism, and
the machine gear is securely connected to the layshaft, wherein the electric machine can be connected to the machine gear via a separating clutch or a free wheel.

2. Gear arrangement according to claim 1, wherein the machine gear is connected via a free wheel to one of the shafts.

3. Gear arrangement for a vehicle, having:
an input shaft,
a layshaft,
an output shaft which can be connected to a drive wheel of the vehicle,
a plurality of shiftable first gear wheel sets which connect the input shaft and the layshaft and which are each associated with at least one gear stage,
a machine gear which is connected or can be connected to one of the shafts and into which the drive torque of an electric machine can be introduced, wherein:
the first gear wheel sets form a first part-gear mechanism, wherein at least one second shiftable gear wheel set connects the layshaft and the output shaft and forms a second part-gear mechanism, wherein the at least one second gear wheel set is associated with at least one gear stage and wherein the machine gear is arranged in an axial direction between the first part-gear mechanism and the second part-gear mechanism, and
the machine gear is connected via a free wheel to an intermediate shaft which is securely connected to an idler wheel of a gear wheel set of the first gear wheel sets, which idler wheel is rotatably supported on the layshaft.

4. Gear arrangement for a vehicle, having:
an input shaft,
a layshaft,
an output shaft which can be connected to a drive wheel of the vehicle,
a plurality of shiftable first gear wheel sets which connect the input shaft and the layshaft and which are each associated with at least one gear stage,
a machine gear which is connected or can be connected to one of the shafts and into which the drive torque of an electric machine can be introduced, wherein:
the first gear wheel sets form a first part-gear mechanism, wherein at least one second shiftable gear wheel set connects the layshaft and the output shaft and forms a second part-gear mechanism, wherein the at least one second gear wheel set is associated with at least one gear stage and wherein the machine gear is arranged in an axial direction between the first part-gear mechanism and the second part-gear mechanism, and
the machine gear is connected or can be connected to an intermediate shaft which is arranged coaxially with respect to the input shaft.

5. Gear arrangement according to claim 4, wherein the intermediate shaft is connected to the input shaft via a shiftable free wheel or a separating clutch.

6. Gear arrangement for a vehicle, having:
an input shaft,
a layshaft,
an output shaft which can be connected to a drive wheel of the vehicle,
a plurality of shiftable first gear wheel sets which connect the input shaft and the layshaft and which are each associated with at least one gear stage,
a machine gear which is connected or can be connected to one of the shafts and into which the drive torque of an electric machine can be introduced, wherein:
the first gear wheel sets form a first part-gear mechanism, wherein at least one second shiftable gear wheel set connects the layshaft and the output shaft and forms a second part-gear mechanism, wherein the at least one second gear wheel set is associated with at least one gear stage and wherein the machine gear is arranged in an axial direction between the first part-gear mechanism and the second part-gear mechanism, and
the wheel sets of the gear arrangement are arranged in a housing which defines a fluid sump for producing a lubrication for the wheel sets, wherein a heat source is arranged in the housing and wherein at least one of (i) the arrangement of the heat source in the housing is selected, and (ii) the housing is constructed, such that the heat source is subjected to the flow of fluid which is thrown up from the fluid sump during operation.

7. Gear arrangement for a vehicle, having:
an input shaft,
a layshaft,
an output shaft which can be connected to a drive wheel of the vehicle,
a plurality of shiftable first gear wheel sets which connect the input shaft and the layshaft and which are each associated with at least one gear stage,
a machine gear which is connected or can be connected to one of the shafts and into which the drive torque of an electric machine can be introduced, wherein:

the first gear wheel sets form a first part-gear mechanism, wherein at least one second shiftable gear wheel set connects the layshaft and the output shaft and forms a second part-gear mechanism, wherein the at least one second gear wheel set is associated with at least one gear stage and wherein the machine gear is arranged in an axial direction between the first part-gear mechanism and the second part-gear mechanism, and the wheel sets of the gear arrangement are arranged in a housing in which a fluid sump is arranged for at least one of lubrication or cooling, wherein a fluid pump draws from the fluid sump fluid which is used to cool a heat source.

8. Drive unit for a vehicle having a gear arrangement which comprises:
an input shaft,
a layshaft,
an output shaft which can be connected to a drive wheel of the vehicle,
a plurality of shiftable first gear wheel sets which connect the input shaft and the layshaft and which are each associated with at least one gear stage,
a machine gear which is connected or can be connected to one of the shafts and into which the drive torque of an electric machine can be introduced,
wherein the first gear wheel sets form a first part-gear mechanism, wherein at least one second shiftable gear wheel set connects the layshaft and the output shaft and forms a second part-gear mechanism, wherein the at least one second gear wheel set is associated with at least one gear stage and wherein the machine gear is arranged in an axial direction between the first part-gear mechanism and the second part-gear mechanism,
an electric machine which is connected to the machine gear of the gear arrangement,
a control device for at least one of controlling a shifting apparatus for the gear wheel sets and controlling the electric machine, and
a sensor arrangement for detecting at least one status variable of the drive unit.

9. Drive unit according to claim 8, wherein the electric machine has a stator which is cooled via a cooling arrangement.

10. Drive unit according to claim 8, wherein the sensor arrangement comprises at least one of:
a rotor position sensor for detecting a rotation position of a rotor of the electric machine
a shifting position sensor a speed sensor for detecting a speed of the input shaft
a rotation position sensor for detecting a relative rotation position of the input shaft
a crank position sensor for detecting a rotation position of cranks which are connected to a drive shaft or
a torque sensor for detecting a muscular force torque which is introduced into a drive shaft.

11. Drive unit according to 8, wherein a printed circuit board, on which the control device or at least one sensor of the sensor arrangement is arranged, is secured to a housing, wherein the control device has an electronic power unit for the electric machine or an electronic power unit for a shifting motor or a microprocessor.

12. Drive unit according to claim 10, wherein the rotor position sensor for detecting a rotation position of a rotor of the electric machine and the shifting position sensor are arranged on a common printed circuit board.

13. Drive unit for a vehicle having a gear arrangement which comprises:
an input shaft,
a layshaft,
an output shaft which can be connected to a drive wheel of the vehicle,
a plurality of shiftable first gear wheel sets which connect the input shaft and the layshaft and which are each associated with at least one gear stage,
a machine gear which is connected or can be connected to one of the shafts and into which the drive torque of an electric machine can be introduced,
wherein the first gear wheel sets form a first part-gear mechanism, wherein at least one second shiftable gear wheel set connects the layshaft and the output shaft and forms a second part-gear mechanism, wherein the at least one second gear wheel set is associated with at least one gear stage and wherein the machine gear is arranged in an axial direction between the first part-gear mechanism and the second part-gear mechanism, and
an electric machine which is connected to the machine gear of the gear arrangement,
wherein a control device is constructed and configured to carry out a shifting operation of at least one of the wheel sets via the shifting apparatus during a second time period, within which a muscular force torque acting periodically on a drive shaft is at a minimum.

14. Drive unit according to claim 13, wherein the control device is constructed and configured, when a wish to shift is detected, to initially increase a torque provided by the electric machine for a first short time period in order to tension at least the gear arrangement and subsequently rapidly to decrease the torque provided by the electric machine in order to place the gear arrangement for the second time period briefly in a load-free state, wherein the shifting apparatus is temporally controlled in such a manner that a shifting of a gear wheel set falls within this second time period.

15. Drive unit according to claim 14, wherein the control device is constructed and configured so that the first short time period overlaps temporally with a time period in which a muscular force torque acting periodically on a drive shaft is at a maximum.

* * * * *